United States Patent
Ficken

(10) Patent No.: US 9,850,709 B2
(45) Date of Patent: Dec. 26, 2017

(54) DOWNHOLE MUD MOTOR WITH A SEALED BEARING PACK

(71) Applicant: Newsco International Energy Services USA, Inc., Conroe, TX (US)

(72) Inventor: Joe Ficken, Casper, WY (US)

(73) Assignee: Newsco International Energy Services USA Inc., Conroe, TX (US)

(*) Notice: Subject to any disclaimer, the term of this patent is extended or adjusted under 35 U.S.C. 154(b) by 0 days.

(21) Appl. No.: 15/075,624

(22) Filed: Mar. 21, 2016

(65) Prior Publication Data

US 2016/0312534 A1    Oct. 27, 2016

Related U.S. Application Data

(60) Provisional application No. 62/135,571, filed on Mar. 19, 2015.

(51) Int. Cl.
*E21B 4/02* (2006.01)
*E21B 4/00* (2006.01)
(Continued)

(52) U.S. Cl.
CPC .............. *E21B 4/003* (2013.01); *E21B 4/02* (2013.01); *E21B 7/068* (2013.01); *F16C 17/02* (2013.01); *F16C 19/30* (2013.01); *F16C 21/00* (2013.01); *F16C 33/74* (2013.01); *F16C 2240/42* (2013.01); *F16C 2240/46* (2013.01); *F16C 2352/00* (2013.01)

(58) Field of Classification Search
CPC ............. E21B 4/003; E21B 4/02; E21B 7/068
See application file for complete search history.

(56) References Cited

U.S. PATENT DOCUMENTS

| 4,240,683 A | 12/1980 | Crase |
| 4,324,299 A | 4/1982 | Nagel |

(Continued)

FOREIGN PATENT DOCUMENTS

| CA | 2184665 | 3/1998 |
| CA | 2299606 | 8/2001 |
| WO | WO 2007/109878 | 10/2007 |

OTHER PUBLICATIONS

"Fixed Cutter Bits," Oil and Gas Products, 2011-2012, Varel Int'l, 28 pages.
(Continued)

*Primary Examiner* — Thomas R. Hannon
(74) *Attorney, Agent, or Firm* — Sheridan Ross P.C.

(57) ABSTRACT

An improved sealed bearing pack for a downhole mud motor is disclosed. More specifically, embodiments of the present invention relate to a mud motor for straight and directional drilling with a sealed bearing pack designed to withstand higher torques, loads, and pressure operations and with a reduced failure rate. In some embodiments, the sealed bearing pack has more lateral support for improved horizontal drilling and extended operational life. Thus, one embodiment includes an adapter housing extending the length of the outer housing and a bearing within the adapter housing for increased support. Additionally, some embodiments include two thrust bearing assemblies for improved operations and reduced failures. Various embodiments include a longer flow sleeve than prior art sealed bearing packs.

14 Claims, 42 Drawing Sheets

(51) Int. Cl.
*E21B 7/06* (2006.01)
*F16C 33/74* (2006.01)
*F16C 17/02* (2006.01)
*F16C 19/30* (2006.01)
*F16C 21/00* (2006.01)

(56) References Cited

U.S. PATENT DOCUMENTS

| | | | |
|---|---|---|---|
| 4,410,054 A | 10/1983 | Nagel et al. | |
| 4,476,944 A | 10/1984 | Beimgraben | |
| 4,620,601 A | 11/1986 | Nagel | |
| 4,646,856 A | 3/1987 | Dismukes | |
| 4,683,964 A | 8/1987 | Wenzel | |
| 4,880,065 A | 11/1989 | McDonald et al. | |
| 5,048,622 A | 9/1991 | Ide | |
| 5,069,298 A | 12/1991 | Titus | |
| 5,195,754 A * | 3/1993 | Dietle | F16C 33/76 175/107 |
| 5,248,204 A | 9/1993 | Livingston et al. | |
| 5,267,905 A | 12/1993 | Wenzel et al. | |
| 5,337,840 A | 8/1994 | Chancey et al. | |
| 5,377,771 A * | 1/1995 | Wenzel | E21B 4/003 175/107 |
| 5,662,180 A | 9/1997 | Coffman et al. | |
| 5,738,358 A | 4/1998 | Kalsi et al. | |
| 5,894,896 A | 4/1999 | Smith et al. | |
| 5,956,995 A | 9/1999 | Herben et al. | |
| 5,957,220 A | 9/1999 | Coffman et al. | |
| 6,202,762 B1 | 3/2001 | Fehr et al. | |
| 6,227,547 B1 | 5/2001 | Dietle et al. | |
| 6,250,806 B1 * | 6/2001 | Beshoory | E21B 4/003 175/107 |
| 6,361,217 B1 | 3/2002 | Beasley | |
| 6,416,225 B1 * | 7/2002 | Cioceanu | E21B 4/003 175/107 |
| 6,561,290 B2 | 5/2003 | Blair et al. | |
| 6,749,030 B2 * | 6/2004 | Blair | E21B 7/068 175/45 |
| 6,827,160 B2 * | 12/2004 | Blair | E21B 4/003 175/107 |
| 7,040,417 B2 | 5/2006 | Campbell et al. | |
| 7,306,031 B2 | 12/2007 | Wright et al. | |
| 7,635,224 B2 * | 12/2009 | Wenzel | E21B 4/003 175/107 |
| 7,703,551 B2 | 4/2010 | Reagan | |
| 7,882,638 B2 | 2/2011 | von Gynz-Rekowski | |
| 8,181,720 B2 | 5/2012 | Prill et al. | |
| 8,376,616 B2 | 2/2013 | Pheasey | |
| 8,511,906 B2 | 8/2013 | Marchand | |
| 2003/0015352 A1 * | 1/2003 | Robin | E21B 4/003 175/107 |
| 2003/0164250 A1 | 9/2003 | Wardley | |
| 2007/0251726 A1 | 11/2007 | Menger | |
| 2008/0029304 A1 | 2/2008 | LeBlanc et al. | |
| 2008/0190669 A1 * | 8/2008 | Cioceanu | E21B 4/02 175/320 |
| 2008/0217062 A1 | 9/2008 | Southard | |
| 2010/0215301 A1 | 8/2010 | Wenzel | |
| 2011/0192648 A1 | 8/2011 | Baudoin | |

OTHER PUBLICATIONS

"INA Product Reference Guide," INA USA Corporation, 2008, 733 pages.
"Product Catalog," Smith Bits, 2013, 98 pages.
"Timken Products Catalog," 2014, Timken Company, 3 pages.

* cited by examiner

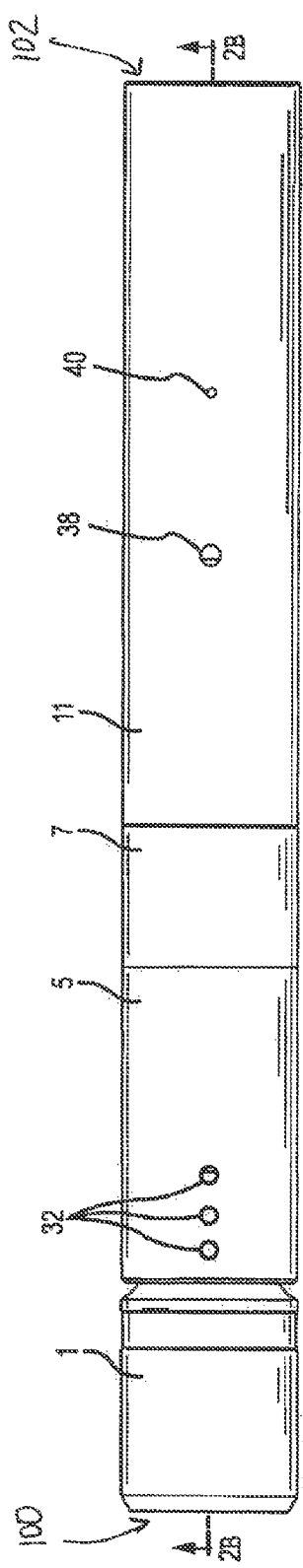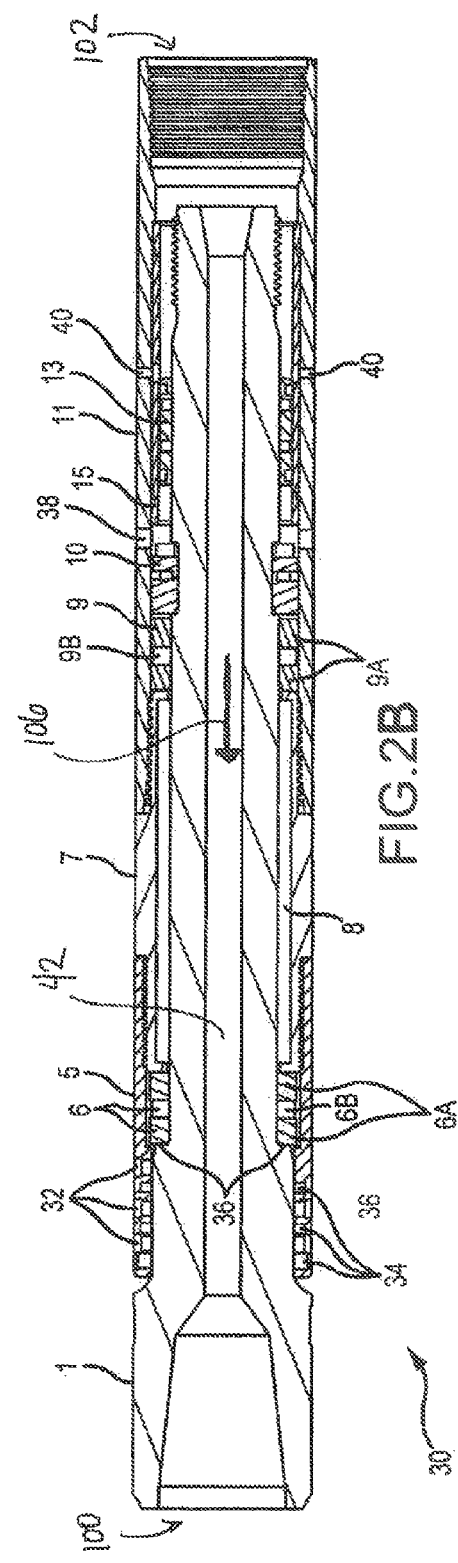

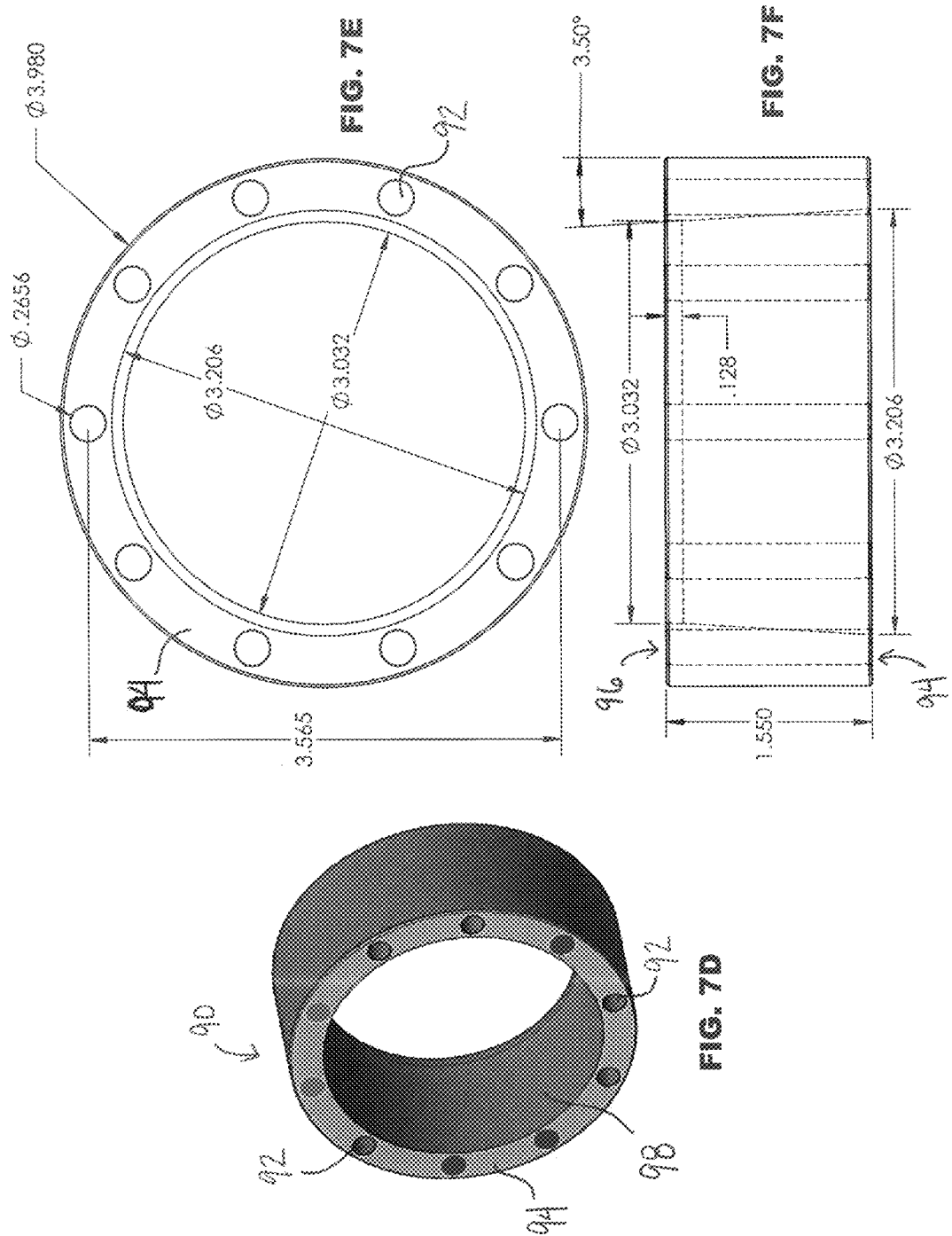

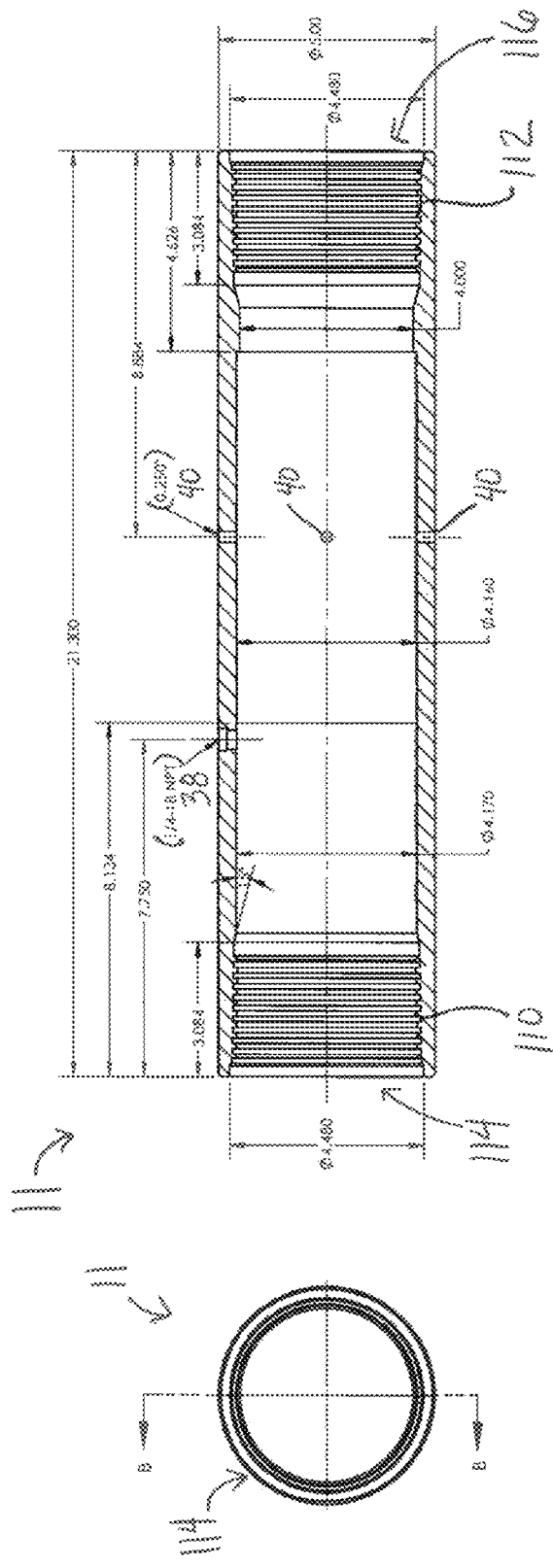

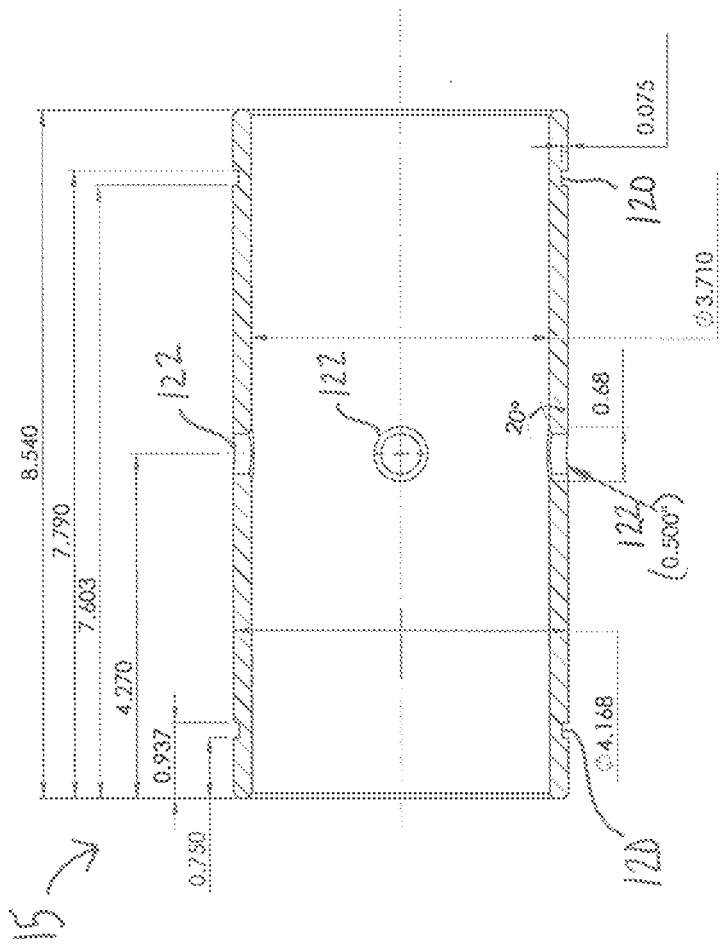
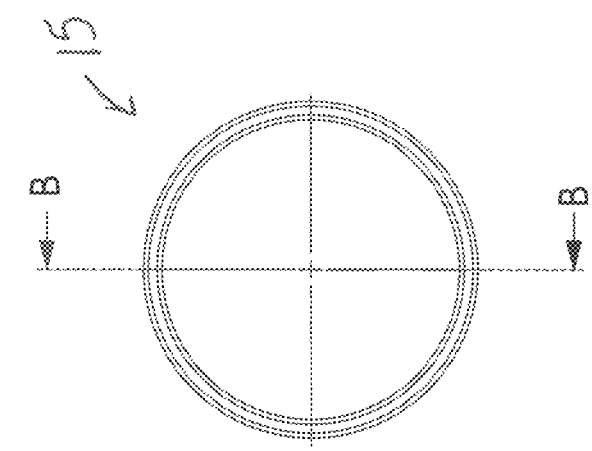
FIG. 9B
FIG. 9A

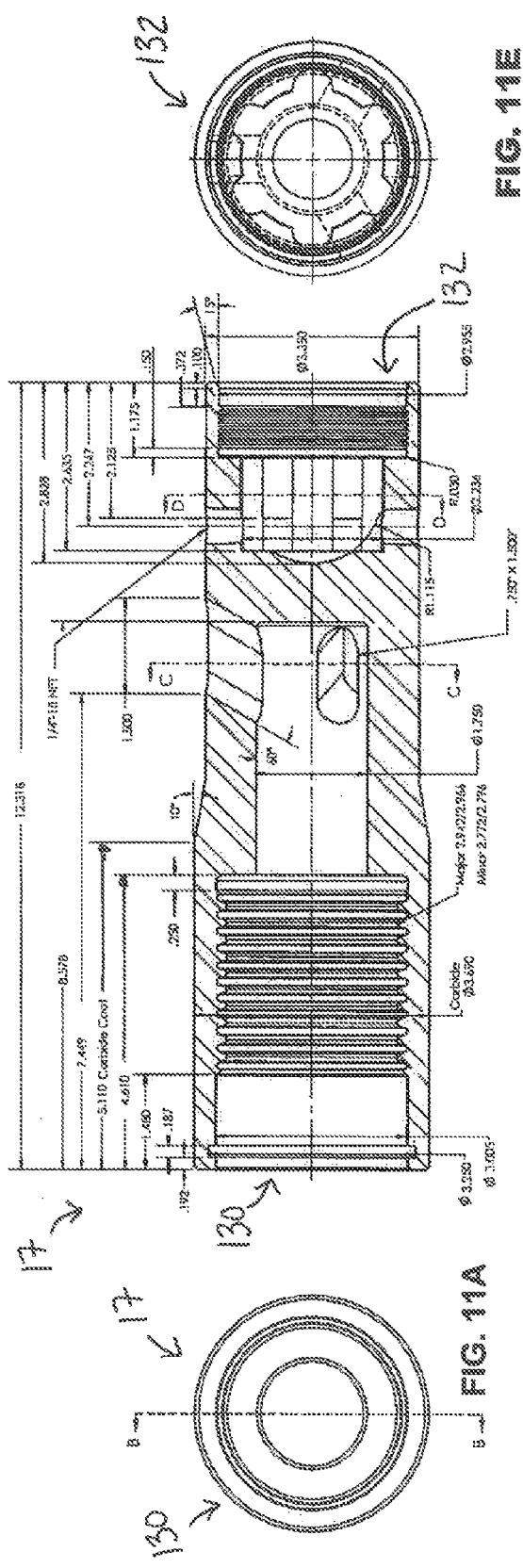

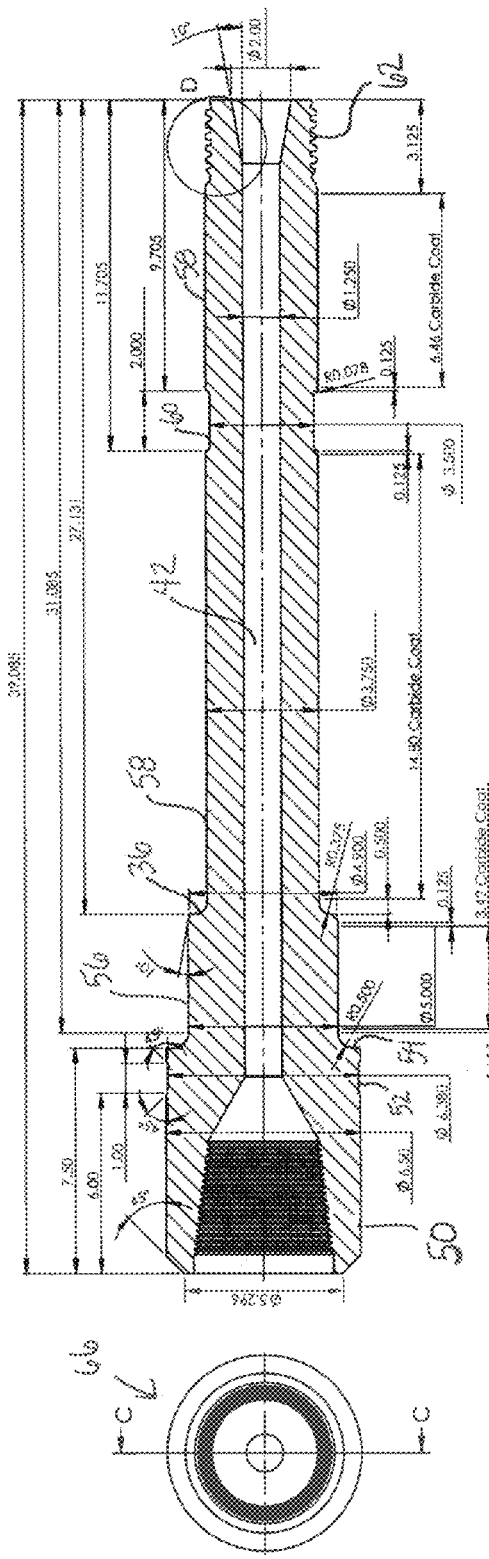
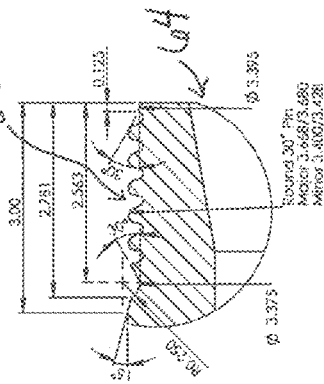
FIG. 12D
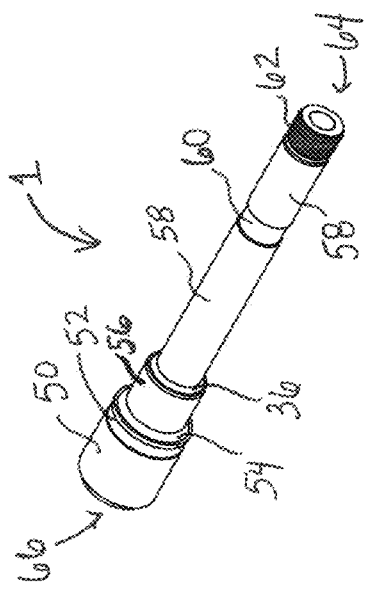
FIG. 12C
FIG. 12A
FIG. 12B

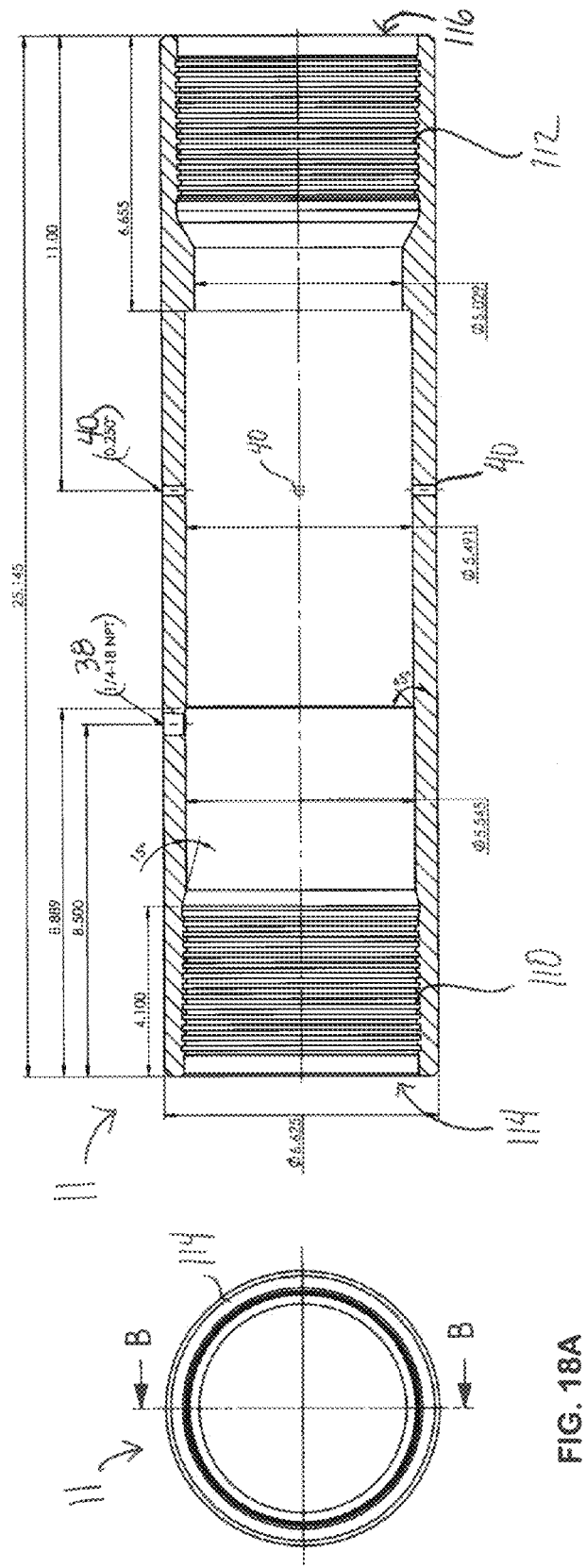

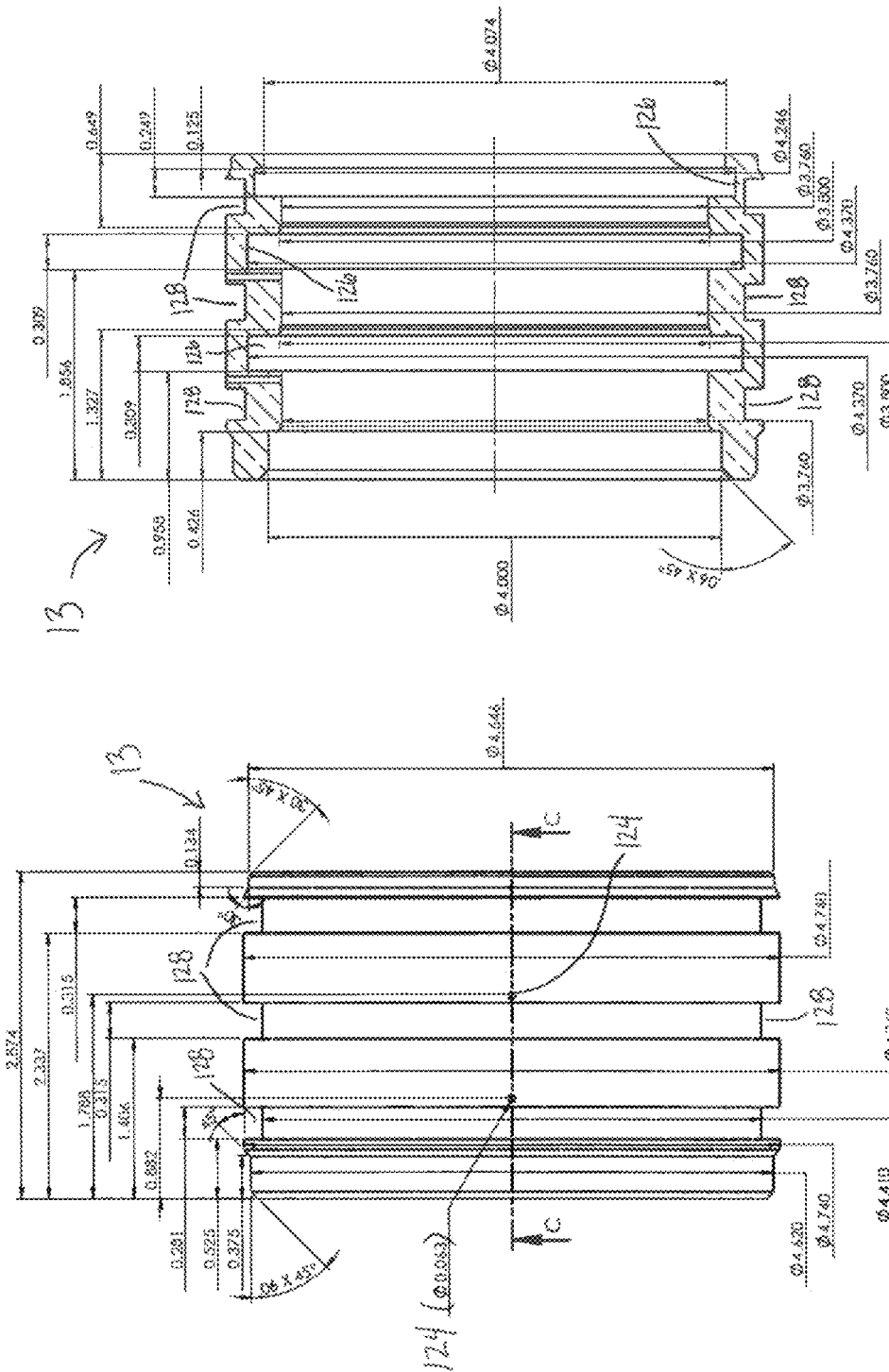

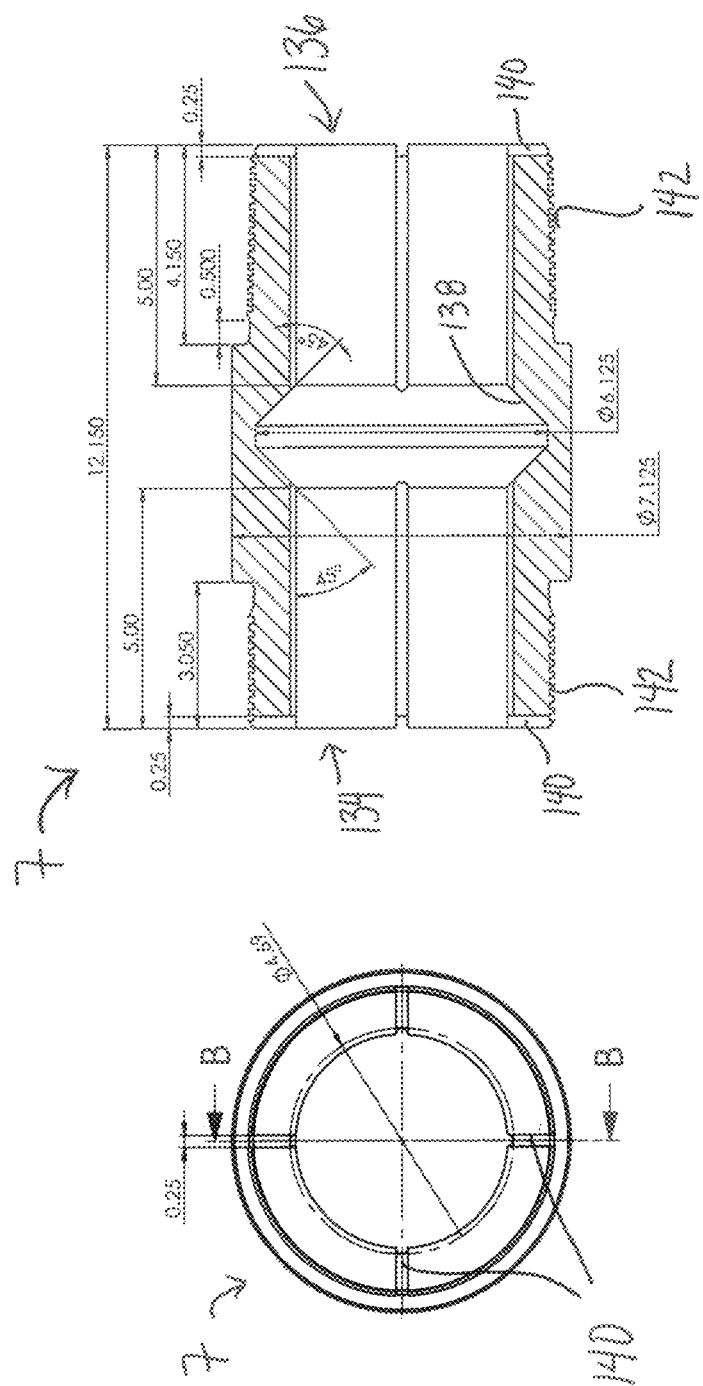

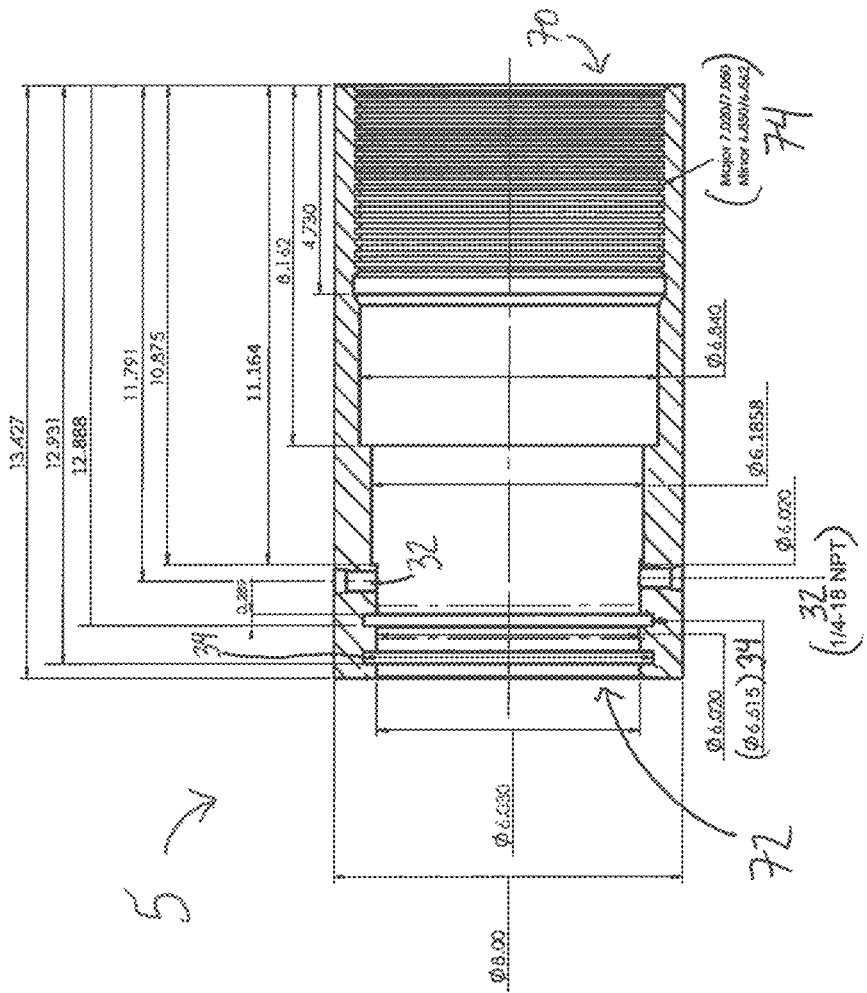
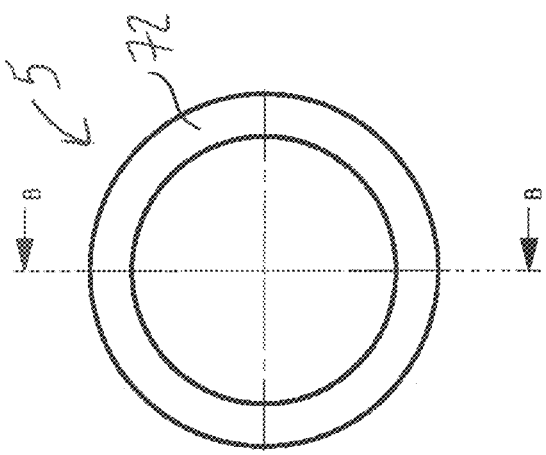
FIG. 31B
FIG. 31A

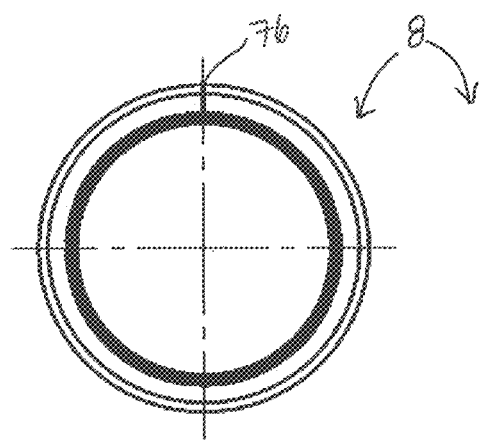
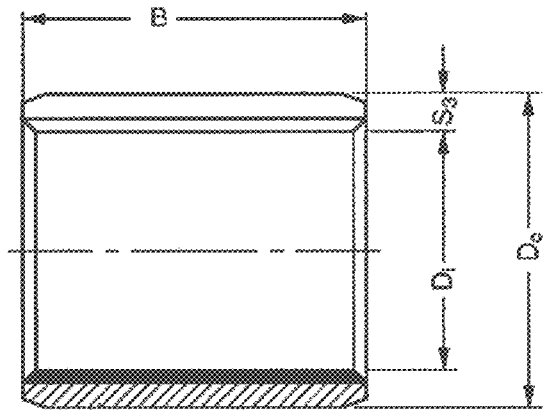
FIG. 34A          FIG. 34B
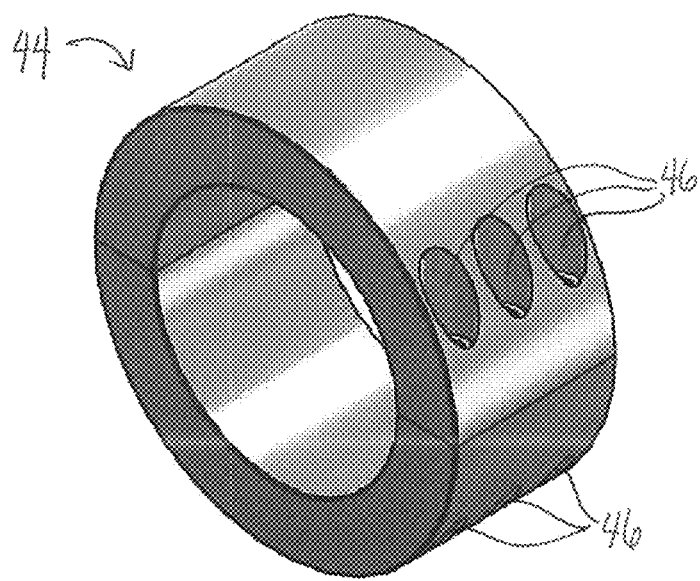
FIG. 35

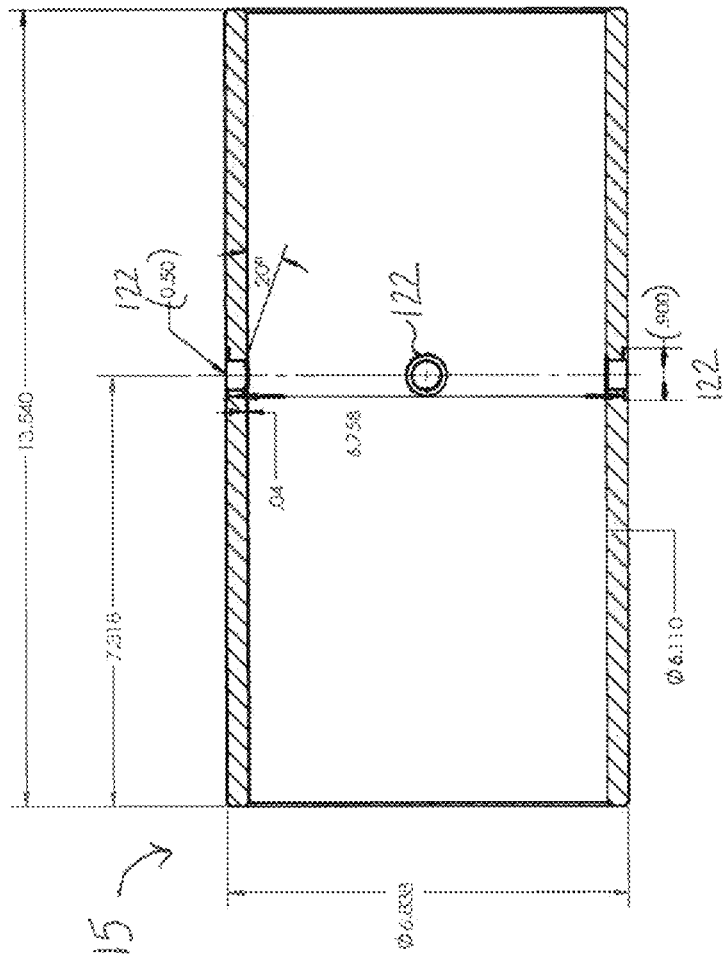
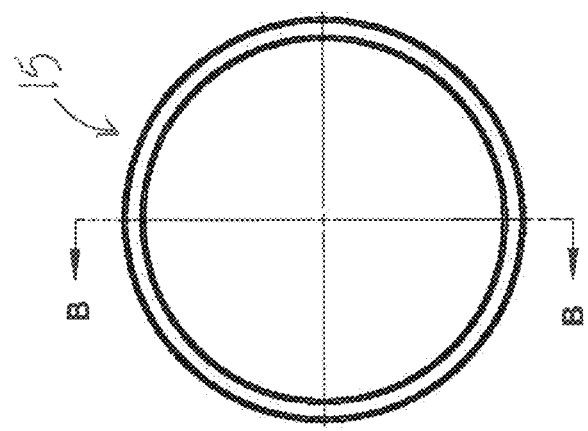
FIG. 37B
FIG. 37A

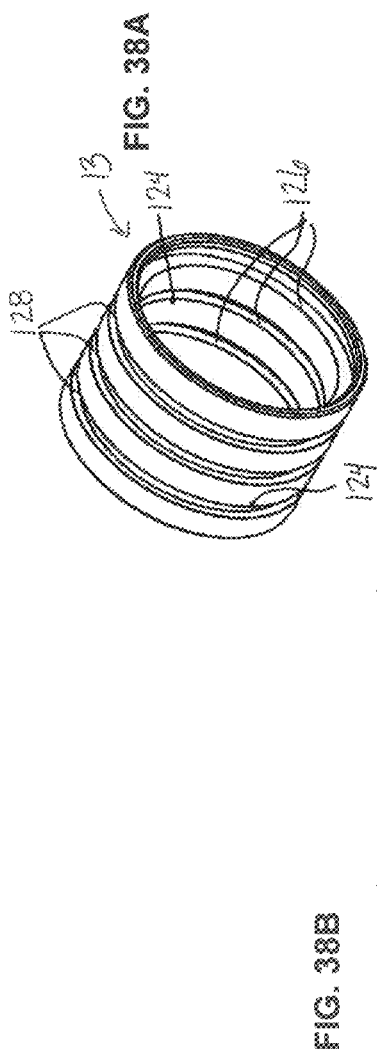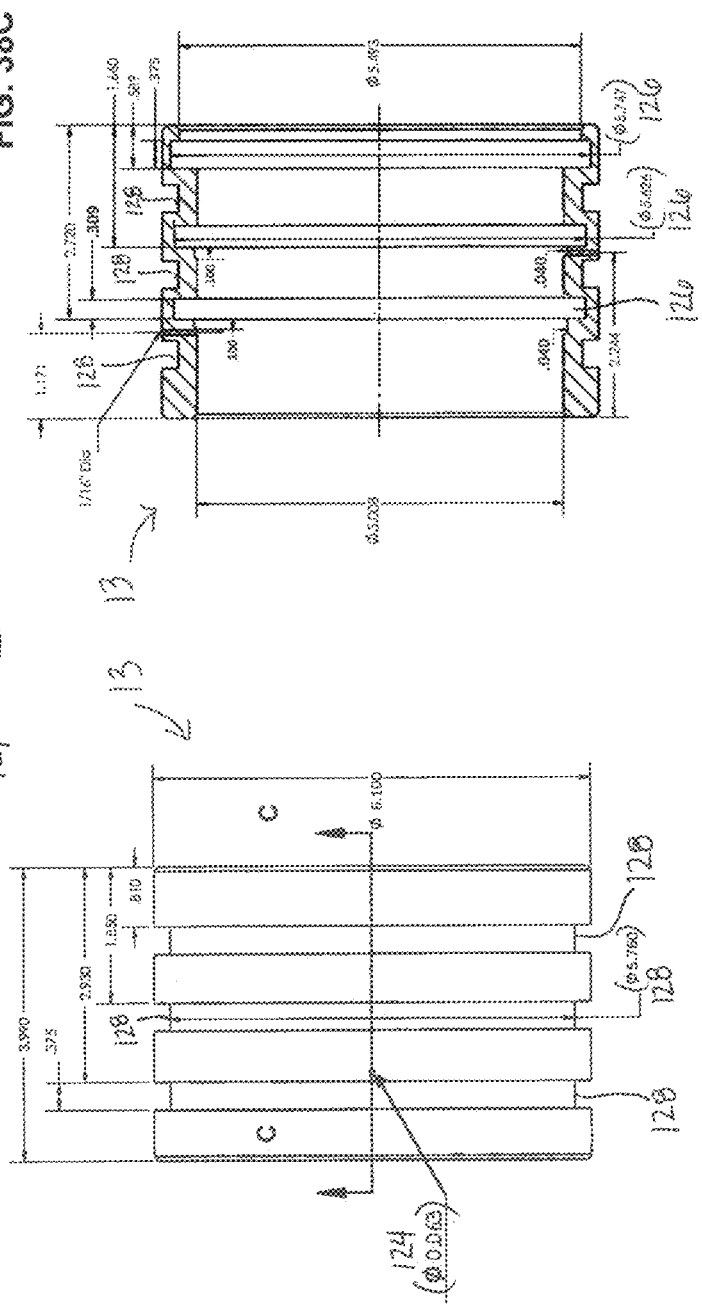

DOWNHOLE MUD MOTOR WITH A SEALED BEARING PACK

CROSS-REFERENCE TO RELATED APPLICATIONS

This application claims the benefit of U.S. Provisional Patent Application Ser. No. 62/135,571, filed Mar. 19, 2015, entitled "Downhole Mud Motor with a Sealed Bearing Pack," which is hereby incorporated by reference in its entirety.

FIELD OF THE INVENTION

Embodiments of the present invention generally relate to drilling with a downhole mud motor, and more specifically to a mud motor with a sealed bearing pack for straight and directional drilling which is designed to withstand higher torques, loads, and downhole pressure with a reduced failure rate.

BACKGROUND OF THE INVENTION

Downhole motors assemblies are well known in the drilling arts. Mud motors are one well-known type of downhole motors. Mud motors are used to supplement drilling operations by turning hydraulic power into mechanical torque and applying this torque to a drill bit. The mud (i.e., drilling fluid) is used to cool and lubricate the drill bit, to carry away drilling debris, and to provide a mud cake on the walls of the annulus to prevent the hole from sloughing in upon itself or from caving in all together. Mud motors are an integral component of a downhole drilling string, which allows a drill bit to be driven using hydraulic horsepower from the circulated drilling mud without requiring the drill pipe to be rotated at the surface. This technology has been used for decades in the oil and gas industry, and is of significant importance in drilling directional, non-linear wellbores since the mud motor can be used in an off-set orientation to "steer" a drill string in a pre-determined direction. The sealed bearing pack is one part of the mud motor and is used to seal the bearings in a "clean" environment where the moving parts in the sealed bearing pack are not exposed to drilling mud, thus extending the life of the mud motor and saving considerable time and expense during drilling operations.

Mud motors operate in very high pressure and high torque operations and are known to fail in certain, predictable ways. The failure of a mud motor is very expensive, as the whole drill string must be pulled out of the bore hole in order to bring the mud motor to the surface where it can be repaired or replaced. This is a very time consuming and costly operation considering the drilling operations must be halted while the drill string and bottom hole assembly are tripped from the wellbore. Common problems that occur with prior art mud motors include: seal failure resulting in drilling mud contaminating the universal joint in the transmission section; pressuring up, often called hydraulically locking, due to either fluid or gas being trapped within the confines of the tool itself; broken bearing mandrels resulting in mud entering into the bearings; and slap, the bouncing around or moving of the thrust bearings.

SUMMARY OF THE INVENTION

These and other needs are addressed by the various embodiments and configurations of the present invention. Embodiments of this invention specifically relate to a novel system, device, and method for providing a mud motor with an improved sealed bearing pack. The novel mud motor and sealed bearing pack provided herein are more durable, resulting in reduced failure rates, which saves the operator considerable time and money.

Oil and gas companies typically use a downhole mud motor assembly to steer the drill bit—and, thus, the wellbore—in a desired direction. The mud motor is used primarily to drill directional wells, where the drill bit is rotated without requiring the entire drill-string to be rotated all the way to the surface. As appreciated by one skilled in the art, this is especially critical in drilling horizontal wells where there is a significant amount of friction between the wellbore and drill string. A typical mud motor comprises a series of components interconnected to the end of a string of drill pipe and enables power to be delivered from drilling mud circulated down the drill string to a fluid motor which converts hydraulic energy to a drill bit. A downhole mud motor assembly generally includes a motor section to convert hydraulic horsepower to rotational energy, a bent (or flex) housing section to provide tool orientation, a sealed bearing pack (or wash bearing pack) to deliver power from the motor to the drill bit, and a drill bit with a series of jet nozzles.

Thus, it is thus one aspect of various embodiments of the present invention to provide a mud motor for straight (i.e., vertical) and directional (i.e., horizontal) drilling that is designed to withstand higher torques, withstand greater downhole pressure, and have increased wear resistance for high angle wellbores.

Horizontal drilling puts radial loading on the sealed bearing pack. Therefore, it is another aspect of various embodiments of the present invention to provide a mud motor with more radial support for improved horizontal drilling. One advantage of some embodiments is that the additional radial support reduces the failure rate of the mud motor. In the past, adding length (along the longitudinal axis/axial direction of the sealed bearing pack) to the sealed bearing pack was thought to add weight and additional components that could fail, thus reducing the operation time of a sealed bearing pack. Further, adding additional components was discouraged because each additional component is one more component that could fail while the mud motor was down in the wellbore. However, embodiments of the present invention include additional radial support to support the bearing mandrel and reduce the failure rate of the sealed bearing pack, especially when performing horizontal drilling operations. In some embodiments, the additional radial support reduces the number of mud motor failures by about 35% to about 50%. Moreover, the increased radial support reduces the stress on the seals (typically Kalsi seals) in the lower bearing housing and/or piston, which allows the seals to last 50% longer than in prior art sealed bearing packs. In one embodiment, the additional radial support is provided by two radial bearings or one extra long radial bearing positioned concentrically around the bearing mandrel and within the adapter housing. In prior art sealed bearing packs, the short radial bearing was positioned within the lower seal carrier or lower bearing housing. In embodiments of the present invention, the radial bearing is positioned substantially within (or entirely within in other embodiments) the adapter housing. Some embodiments of the present invention include two radial bearings or one extra long radial bearing positioned concentrically within the adapter housing and another radial bearing within the lower bearing housing for further radial support, even though additional components (even additional radial bearings) were discouraged in prior art sealed bearing packs. In another embodiment, the additional radial support is provided by an adapter housing, which is an added component that was also discouraged in prior art sealed bearing packs. In prior art sealed bearing packs, the trend and recommended construction used a single exterior housing to limit leaks between housing components and additional parts. However, embodiments of the present invention use a lower bearing housing, an adapter housing, and a flow housing to create the outer housing. Providing an outer housing comprised of multiple pieces also enables the outer housing to be longer than prior art housings. In still further embodiments, the additional radial support is provided by two radial bearings or one extra long radial bearing and an adapter housing. Thus, the addition of the adapter housing and the second radial bearing (or an extra long radial bearing) had unexpected results because these components allow the sealed bearing pack to operate for 50% longer before experiencing a failure.

Additionally, the radial bearing can be Teflon-coated to further reduce the failure rate. The radial bearing experiences a lot of wear and radial loads; therefore, having a replaceable radial bearing is advantageous because then the operator only has to replace the radial bearing and not the entire outer housing, which saves time and money. Moreover, positioning the radial bearing in the adapter housing permits easy, on-site replacement of the radial bearing. In prior art systems, the operator would have to disassemble a majority of the sealed bearing pack to get to the radial bearing within the lower seal carrier and/or outer housing. Now, the operator only has to disassemble the adapter housing from the lower bearing housing and the flow housing and then remove and replace the radial bearing. This simple replacement means that the mud motor can get back into the wellbore and back to drilling much quicker than in prior art packs.

Another advantage of the added adapter housing is that the lower end of the adapter housing is positioned adjacent to the on-bottom thrust bearing assembly such that the adapter housing according to embodiments of the present invention prevents the on-bottom thrust bearing assembly from moving in the axial direction and thus eliminates the need for a split ring or clamp to hold the on-bottom thrust bearing assembly in place. Additionally, the upper end of the adapter housing is positioned adjacent to the lower race of the off-bottom thrust bearing assembly and prevents the off-bottom thrust bearing assembly from moving in the axial direction.

One aspect of embodiments of the present invention is to provide a mud motor with a more robust sealed bearing pack. In one embodiment, the sealed bearing pack includes a removable, long-life flow sleeve with 50% more life than flow sleeves of the prior art. Additionally, the flow sleeve is selectively removable, unlike flow sleeves of the prior art that were not removable. Thus, only the flow sleeve needs to be replaces and not the entire flow housing if the flow sleeve fails.

Another aspect of various embodiments of the present invention is to provide a mud motor with a sealed bearing pack having reduced slap, i.e., movement between the thrust bearing assembly (which may include on-bottom thrust bearings) and the housing (which may be an adapter housing or other outer housing). In one embodiment, the on-bottom bearing assembly is positioned within the lower bearing housing, which is different from prior art sealed bearing packs where the thrust bearing assembly was positioned above the lower bearing housing (sometimes called the lower seal carrier). Prior art systems positioned the bearing assembly proximate the center of the sealed bearing pack to distribute support. Therefore, moving the thrust bearing assembly lower (closer to the drill bit) was discouraged. However, moving the thrust bearing assembly lower (closer to the drill bit) had unexpected results in that it reduced slap (clearance between the thrust bearing and snap rings of prior art sealed bearing packs or clearance between the thrust bearing and the adapter housing of the present invention). Thus, in embodiments of the present invention, the on-bottom thrust bearing assembly is positioned proximate to the drill bit and lower seals to reduce slap. Further, the adapter housing provides a more stable constraint on the upper race of the on-bottom thrust bearing assembly than was provided by snap rings and clamps of prior art sealed bearing packs.

Still further, it is one aspect of embodiments of the present invention to provide a sealed bearing pack with an on-bottom thrust bearing assembly and an off-bottom thrust bearing assembly for additional bearing mandrel support. In one embodiment, the off-bottom thrust bearing assembly is a heavy duty assembly providing much more support than bearing assemblies of the prior art.

It is another aspect of embodiments of the present invention to provide a sealed bearing pack with an improved split ring or hub lock that can withstand more over-pull without sliding on the bearing mandrel, meaning more pressure and weight on the pack/hub lock when pulling the drill string out of the wellbore. Split rings of the prior art had a tendency to slide along the bearing mandrel, which then permitted the thrust bearing assembly to slide along the bearing mandrel. The sliding of the split ring and thrust bearing assembly created slap, which then caused the split ring and/or thrust bearing assembly to prematurely fail. Additionally, the hub lock pieces interconnect to one another using fasteners positioned along the longitudinal axis of the sealed bearing pack. Prior art split rings and clamps used fasteners positioned perpendicular to the longitudinal axis. The new orientation of the fasteners provides additional strength and support, which also reduces failure rates.

One aspect of various embodiments of the present invention is to provide a sealed bearing pack with an improved piston that can equalize the hydrostatic pressure such that the seals on the outer surface of the piston do not lock-up. Specifically, pistons according to embodiments of the present invention include a mechanism to equalize the hydrostatic pressure experienced by the piston. In prior art sealed bearing packs, when the mud motor is drilling down in the wellbore, the hydrostatic pressure on the piston squeezes and thus locks the piston seals, which hinders movement of the piston. Pistons according to embodiments of the present invention have one or more openings or weep holes to allow the pressure to release such that the seals do not lock. The opening(s) equalize the pressure experienced by the piston by allowing some of the lubricating fluid to exit the sealed section of the sealed bearing pack through the opening(s). Thus the hydrostatic head experienced by the piston is reduced because the lubricating fluid is in pressure communication with the downhole hydrostatic pressure and the pressure of the drilling mud behind (above) the piston. Further, in some embodiments the piston is made of steel, rather than cast iron like pistons of the prior art. The steel piston is stronger and has a longer life cycle than cast iron pistons of the prior art.

It is another aspect of various embodiments of the present invention to provide a sealed bearing pack with improved lubrication features in the pack's lower bearing housing. For example, additional lubricating fluid reservoirs are provided in the lower bearing housing such that there is a reservoir between each seal in the lower bearing housing. Further, the lower bearing housing has mechanisms to permit more lubricating fluid to reach and remain around each seal of the lower bearing housing such that the lower bearing housing can easily slide along the bearing mandrel and the failure rate of these seals is reduced. In one embodiment, one such mechanism is additional pluggable openings positioned between each seal in the lower bearing housing. Thus, in some embodiments, there is one opening between each seal of the lower bearing housing. Adding additional openings was often discouraged in prior art systems because each opening creates a new possible entry point for drilling mud and debris. However, the addition of the openings creates a larger lubricating fluid reservoir by creating more lubricating fluid reservoirs and ensures that lubricating fluid can be added to and actually reach each seal in the lower bearing housing. These additional openings allow lubricating fluid to be inserted into the lower bearing housing between each seal.

One aspect of embodiments of the present invention is to provide a sealed bearing pack that can easily and quickly be repaired on-site to reduce the time the sealed bearing pack is not drilling. For example, embodiments of the present invention permit the operator to replace and/or repair the seals, radial bearing(s), flow sleeve, and lubricating fluid on-site.

Another aspect of embodiments of the present invention is a method for manufacturing an improved sealed bearing pack.

In one embodiment of the present invention, a sealed bearing pack for use in a mud motor assembly is provided. The sealed bearing pack comprises a bearing mandrel having an outer surface having a first outer diameter, a second outer diameter, a third outer diameter, a groove positioned within the third outer diameter, and a shoulder between the second outer diameter and the third outer diameter; an outer housing comprising: a lower bearing housing with a lower end, an upper end, at least one opening, and an inner surface positioned proximate to the second outer diameter of the bearing mandrel outer surface, wherein the inner surface has two or more grooves for receiving sealing elements, and wherein the at least one opening is for providing a lubricating fluid; an adapter housing section with a lower end having a lower surface, an upper end having an upper surface, and a substantially smooth inner surface, wherein the lower end of the adapter housing is interconnected to the upper end of the lower bearing housing; and a flow housing with an inner surface, an outer surface, a lower end, an upper end, a first opening, and a second opening, wherein the lower end of the flow housing is interconnected to the upper end of the adapter housing, and wherein the first opening is adapted to allow for introduction of the lubricating fluid and the second opening provides communication to an annulus of the sealed bearing pack and wellbore; a hub lock comprising a lower surface and an inner surface, wherein the hub lock is positioned in the groove of the bearing mandrel outer surface such that the inner surface of the hub lock is adjacent to the outer surface of the bearing mandrel; an on-bottom thrust bearing assembly encircling the third outer diameter of the bearing mandrel outer surface and positioned within the lower bearing housing, wherein a lower surface of the on-bottom thrust bearing assembly is positioned adjacent the shoulder of the bearing mandrel outer surface, wherein an upper surface of the on-bottom thrust bearing assembly is positioned adjacent the lower surface of the adapter housing, and wherein the on-bottom thrust bearing assembly rotationally supports the bearing mandrel; an off-bottom thrust bearing assembly encircling the third outer diameter of the bearing mandrel outer surface and positioned within the flow housing, wherein a lower surface of the off-bottom thrust bearing assembly is positioned adjacent the upper surface of the adapter housing, wherein an upper surface of the off-bottom thrust bearing assembly is positioned adjacent the lower surface of the hub lock; a bearing encircling the third outer diameter of the bearing mandrel outer surface and having an outer surface positioned adjacent to the substantially smooth inner surface of the adapter housing; a piston encircling or positioned on the third outer diameter of the bearing mandrel outer surface, the piston comprising an outer surface having at least two grooves and an inner surface having at least two grooves and adapted for separating lubricating fluid from drilling mud; and a flow sleeve having an outer surface positioned proximate to the inner surface of the flow housing and an inner surface positioned proximate to the outer surface of the piston, wherein the outer surface of the flow sleeve comprises at least two grooves for receiving sealing elements, and wherein the flow sleeve comprises an opening positioned concentrically aligned with the second opening of the flow housing.

In a further embodiment of the present invention, an outer surface of the lower end of the adapter housing has threads to threadingly engage threads on an inner surface of the upper end of the lower bearing housing. In alternate or additional embodiments, an outer surface of the upper end of the adapter housing has threads to threadingly engage threads on an inner surface of the lower end of the flow housing. In some embodiments, the on-bottom thrust bearing assembly comprises one radial bearing and two races and the off-bottom thrust bearing assembly comprises one radial bearing and two races. IN various embodiments, one sealing element positioned in one of the two or more grooves in the inner surface of the lower bearing housing is a PolyPak seal. Further, one sealing element positioned in one of the two or more grooves in the inner surface of the lower bearing housing is a Kalsi Seal®. In some embodiments of the present invention, an upper end of the sealed bearing pack is interconnected to a flex shaft. Additionally, pressure is equalized between an interior of the sealed bearing pack and the annulus of the sealed bearing pack and the wellbore. In one embodiment, the hub lock further comprises a two-piece ring (split collar) and a ring (outer collar).

In one embodiment, the piston comprises at least one opening through which the lubricating fluid can flow. In another embodiment, the sealed bearing pack of further comprises a second bearing positioned concentrically within the adapter housing. In a further embodiment, the sealed bearing pack of further comprises a third bearing positioned concentrically within the lower bearing housing. In one embodiment, the flow sleeve is selectively removable from the sealed bearing pack. In various embodiments, one opening in the at least one opening in the lower bearing housing is positioned between two grooves of the two or more grooves for receiving sealing elements. Further, the lower bearing housing further comprises at least one lubricating fluid reservoir positioned between each groove in the two or more grooves in the lower bearing housing.

For purposes of further disclosure, the following references generally related to mud motors and/or sealed bearing packs are hereby incorporated by reference in their entireties:

U.S. Pat. No. 7,500,787 to Cioceanu issued on Mar. 10, 2009;

U.S. Pat. No. 6,416,225 issued to Cioceanu et al. on Jul. 9, 2002;

U.S. Patent Publication No. 2008/0190669 to Cioceanu published on Aug. 14, 2008;

U.S. Pat. No. 6,749,030 issued to Blair et al. on Jun. 15, 2004;

U.S. Pat. No. 6,827,160 issued to Blair et al. on Dec. 7, 2004;

U.S. Pat. No. 5,377,771 issued to Wenzel on Jan. 3, 1995;

U.S. Pat. No. 7,635,224 issued to Wenzel on Dec. 22, 2009;

U.S. Pat. No. 6,250,806 issued to Beshoory on Jun. 26, 2001;

U.S. Patent Publication No. 2003/0015352 to Robin published on Jan. 23, 2003; and U.S. Pat. No. 5,195,754 issued to Dietle on Mar. 23, 1993.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the invention given above and the detailed description of the drawings given below, serve to explain the principles of the invention.

FIG. 2A shows a side elevation view of one embodiment of the sealed bearing pack;

FIG. 2B shows a cross-sectional view of section 2B-2B of the sealed bearing pack;

FIGS. 3A-3E show one embodiment of a bearing mandrel;

FIGS. 7A-7F show one embodiment of a hub lock;

FIGS. 8A-8B show one embodiment of a flow housing;

FIGS. 9A-9B show one embodiment of a flow sleeve;

FIGS. 11A-11E show one embodiment of a bearing adapter;

FIGS. 12A-12D show a bearing mandrel according to another embodiment;

FIGS. 18A-18B show another embodiment of a flow housing;

FIGS. 20A-20C show another embodiment of a piston;

FIGS. 24A-24B show an alternative embodiment of an adapter housing;

FIGS. 31A-31B show a lower bearing housing 5 according to another embodiment;

FIGS. 34A-34B show another embodiment of a radial bearing;

FIG. 35 shows a two-piece split ring;

FIGS. 37A-37B show another embodiment of a flow sleeve; and

FIGS. 38A-38C show another embodiment of a piston.

Figure 1:
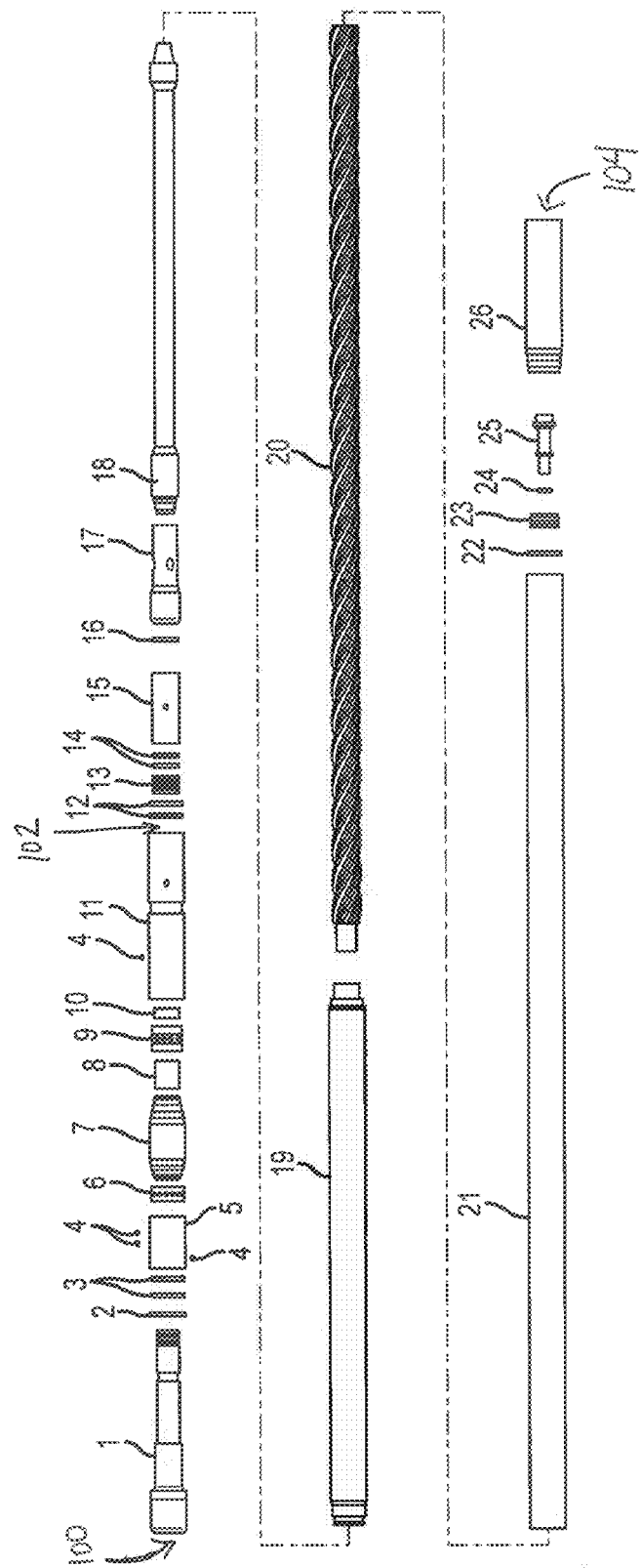
FIG. 1 shows an exploded view of one embodiment of a mud motor depicting the various components associated therein.

To assist in the understanding of the embodiments of the present invention the following list of components and associated numbering found in the drawings is provided herein:

| No. | Component |
|---|---|
| 1 | Bearing Mandrel |
| 2 | Seal |
| 3 | Seal |
| 4 | Plug |
| 5 | Lower Bearing Housing |
| 6 | On-Bottom Thrust Bearing Assembly |
| 6A | Race |
| 6B | Bearing |
| 7 | Adapter Housing |
| 8 | Radial Bearing |
| 9 | Off-Bottom Thrust Bearing Assembly |
| 9A | Race |
| 9B | Bearing |
| 10 | Clamp or Hub Lock |
| 11 | Flow Housing |
| 12 | Seal |
| 13 | Piston |
| 14 | Seal |
| 15 | Flow Sleeve |
| 16 | Seal |
| 17 | Bearing Adapter |
| 18 | Flex Shaft |
| 19 | Flex Housing |
| 20 | Rotor |
| 21 | Stator |
| 22 | Seal |
| 23 | Catch Ring |
| 24 | Seal |
| 25 | Catch Bolt |
| 26 | Top Sub |
| 30 | Sealed Bearing Pack |
| 32 | Openings in Lower Bearing Housing (for lubricating fluid) |
| 34 | Notch for Seal |
| 36 | Second Shoulder in Outer Surface of Bearing Mandrel |
| 38 | Opening in Flow Housing (for lubricating fluid) |
| 40 | Openings in Flow Housing (for mud) |
| 42 | Central Cavity (of bearing mandrel) |
| 44 | Split Ring |
| 46 | Through Holes |
| 50 | First Outer Surface of Bearing Mandrel |
| 52 | First Notch in First Outer Surface of Bearing Mandrel |
| 54 | First Shoulder in Outer Surface of Bearing Mandrel |
| 56 | Second Outer Surface of Bearing Mandrel |
| 58 | Third Outer Surface of Bearing Mandrel |
| 60 | Second Notch in Third Outer Surface of Bearing Mandrel |
| 62 | Threaded Outer Surface of Bearing Mandrel |

-continued

| No. | Component |
|---|---|
| 64 | Upper End of Bearing Mandrel |
| 66 | Lower End of Bearing Mandrel |
| 70 | Upper End of Lower Bearing Housing |
| 72 | Lower End of Lower Bearing Housing |
| 74 | Threaded Inner Surface of Lower Bearing Housing |
| 76 | Bush Joint |
| 78 | Split Collar of Hub Lock |
| 80 | Through Holes |
| 82 | Front Surface of Split Collar |
| 84 | Lip of Split Collar |
| 86 | Cylindrical Portion of Split Collar |
| 88 | Rear Surface of Split Collar |
| 90 | Outer Collar of Hub Lock |
| 92 | Through Holes |
| 94 | Front Surface of Outer Collar |
| 96 | Rear Surface of Outer Collar |
| 98 | Inner Surface of Outer Collar |
| 100 | Lower End of Sealed Bearing Pack and Mud Motor |
| 102 | Upper End of Sealed Bearing Pack |
| 104 | Upper End of Mud Motor |
| 106 | Drilling Mud Flow Path Direction |
| 110 | First Threaded Inner Surface of Flow Housing |
| 112 | Second Threaded Inner Surface of Flow Housing |
| 114 | Lower End of Flow Housing |
| 116 | Upper End of Flow Housing |
| 120 | Notch in Flow Sleeve |
| 122 | Openings in Flow Sleeve |
| 124 | Opening in Piston |
| 126 | Notches in Inner Surface of Piston |
| 128 | Notches in Outer Surface of Piston |
| 130 | Lower End of Bearing Adapter |
| 132 | Upper End of Bearing Adapter |
| 134 | Lower End of Adapter Housing |
| 136 | Upper End of Adapter Housing |
| 138 | Oil Reservoir Cutout |
| 140 | Mill Slots |
| 142 | Threaded Outer Surface of Adapter Housing |
| B | Length of Radial Bearing |
| $D_i$ | Inner Diameter of Radial Bearing |
| $D_o$ | Outer Diameter of Radial Bearing |
| $S_3$ | Thickness of Radial Bearing |

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The Detailed Description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Additionally, any combination of features shown in the various figures can be used to create additional embodiments of the present invention. Thus, dimensions, aspects, and features of one embodiment can be combined with dimensions, aspects, and features of another embodiment to create the claimed embodiment. For example, dimensions, features, and aspects the embodiment shown in FIG. 3C can be combined with dimensions, features, and aspects of the embodiment shown in FIGS. 12C, 21C, and/or 30C.

FIG. 1 shows the main components of one embodiment of a mud motor. The lower end 100 of the mud motor (which is also the lower end 100 of the sealed bearing pack) is shown on the upper left portion of FIG. 1. The upper end 104 of the mud motor is shown on the lower right portion of FIG. 1. In general, the mud motor comprises a drill bit or drill head, a sealed bearing pack, a flex shaft 18 in a flex housing 19, and a rotor 20 in a stator 21 (also called a stator tube). A rotor of any type or configuration can be used in various embodiments. A stator of any type or configuration can be used in various embodiments. In some embodiments, the mud motor will have a drive shaft inside a drive shaft housing rather than a flex shaft in a flex housing. In one embodiment, the sealed bearing pack comprises a bearing mandrel 1, a seal 2, one or more additional seals 3, one or more plugs 4, a lower bearing housing 5, an on-bottom thrust bearing assembly 6, an adapter housing 7, one or more radial bearings 8, an off-bottom thrust bearing assembly 9, a hub lock (or clamp) 10, a flow housing 11, one or more seals 12, a piston 13, one or more seals for axial constraint 14, a flow sleeve 15, and a seal 16 proximate the upper end 102 of the sealed bearing pack. The seals 2, 3, 12, 14, 16 can be any combination of Kalsi® seals, PolyPak seals, O-rings, or any other seals known in the art. In one embodiment, seal 2 is a PolyPak seal, seal 3 is a wide-footprint Kalsi® seal, seal 14 is a Kalsi® seal, and seals 12, 16 are 0-rings. Kalsi® seals can be used if a seal for axial constraint is needed. The radial bearing 8 can be a DU bearing or an MU bearing or any other known radial bearing. In one embodiment, the sealed bearing pack has four plugs 4, which are ¼" NPT×⅜" Teflon-coated hex plugs. National Pipe Thread ("NPT") taper is a U.S. standard for tapered threads used on threaded pipes and fittings. In contrast to straight threads that are found on a bolt, a taper thread will pull tight and therefore make a fluid-tight seal.

An upper end (opposite the drill bit) of the bearing mandrel 1 is interconnected to a lower end (proximate to the drill bit) of a bearing adapter 17. The upper end of the bearing adapter 17 is interconnected to the flex shaft 18. An upper end of the flow housing 11 is interconnected to a lower end of the flex housing 19. Further, an upper end of the flex shaft 18 is interconnected to a lower end of the rotor 20, and an upper end of the flex housing 19 is interconnected to a lower end of the stator 21. An upper end of the stator 21 is interconnected to a lower end of the top sub 26. A catch ring 23, two seals 22, 24, and a catch bolt 25 are positioned within the stator 21 and the top sub 26 proximate to the interconnection point of the stator 21 and the top sub 26. The seals 22, 24 can be any combination of Kalsi® seals, PolyPak seals, O-rings, or any other seals known in the art. In one embodiment, the seals 22, 24 are O-rings.

FIG. 2A shows a side elevation view of one embodiment of the sealed bearing pack 30 assembly. More specifically, the sealed bearing pack 30 is a sealed section (i.e., at least one seal on either end of the sealed section) where oil or another lubricating fluid, other than drilling mud, is used to lubricate the components within the sealed section of the sealed bearing pack. Having an area separated from the drilling mud is critical to prevent abrasive tool wear and damage, and to extend the life of the tool during operation. Thus, the bearing chamber is filled with oil through fill ports or openings 32, 38 that are sealed off, before drilling, by metal plugs or welded caps. The plugs are threaded in some embodiments to ensure they stay secured in the openings 32, 38. The bearing chamber is sealed at an upper end by seals 12, 14 on the floating piston 13 and by seals 2, 3 on a lower end. These seals, and alternative variations well known by one skilled in the art, are critical to maintain the lubricating fluid (e.g., oil) within the chamber and around the bearing assemblies 6, 9 contained therein.

FIG. 2B shows a cross-sectional view of section 2B-2B of the sealed bearing pack 30. Generally, a sealed bearing pack 30 includes lubricating fluid and the following components, in order from the top of the sealed bearing pack (near the flex shaft 18) to the bottom of the sealed bearing pack (near the drill bit): a bearing mandrel 1 (also called output shaft), a flow housing 11, a flow sleeve 15, a piston 13, a clamp or hub lock 10, at least one a thrust bearing assembly 6, 9, an outer bearing housing (also called a bearing housing), and a lower bearing housing 5 (also called a lower seal carrier). In some embodiments, the outer bearing housing comprises one or more pieces. The clamp or hub lock 10 is positioned in a groove or notch 60 of the bearing mandrel 1. In the embodiment shown, the sealed bearing pack 30 has an adapter housing 7 interconnected at a lower end to an upper end of the lower bearing housing 5 and interconnected on an upper end to a lower end of the flow housing 11. The drilling mud flows in the direction 106 shown, meaning from the upper end 102 of the sealed bearing pack 30 (near the flex shaft 18) to the lower end 100 of the sealed bearing pack 30 through a central cavity 42 and out through the drill bit.

The outer bearing housing is a one-, two-, or three-piece section of pipe which provides a structural assembly to contain the bearing pack components and lubricating fluid, including the rotating bearing mandrel 1, piston 13, flow sleeve 15, thrust bearing assembly 6, 9, hub lock 10, and lower bearing housing 5. In the embodiment shown, the outer bearing housing is comprised of three pieces: a lower bearing housing 5, an adapter housing 7, and a flow housing 11. The external dimensions and geometry of these housings 5, 7, 11 dictate the positioning of the various components within the sealed bearing pack 30, as well as the fit with the rotating bearing mandrel 1. In some embodiments, the flow housing 11 also has an opening (also called a port) 40 for drilling mud to exit the annulus above (away from the drill bit) the piston 13. This opening 40 permits balancing of the internal drill pipe pressure and external drilling mud pressure on the exterior of the drill string bottom hole assembly. These ports 40 often suffer from wear and tear due to the abrasive particles found in drilling mud. Thus, in some embodiments, the port 40 is threaded and an off-the-shelf bit nozzle is screwed into the threaded port 40 to protect the threads and allow easy replacement. In other embodiments, a bit nozzle is not used such that the total flow area of the port 40 is increases.

The bearing mandrel 1 rotates around its longitudinal axis and is used to transmit torque from the flex shaft 18 to the drill bit. The bearing mandrel 1 provides a smooth exterior surface for contacting the seals provided in the various other components such as the piston 13 and lower bearing housing 5, and has a geometry including various shoulders to support or retain other components within the sealed bearing pack 30. The bearing mandrel 1 is also supported by the thrust bearing assemblies 6, 9.

The flow sleeve (also called a flow restrictor) 15 serves the purpose of restricting the flow of drilling mud on the exterior surface of the rotating mandrel 1 above the piston 13. The flow sleeve 15 prevents high volumes of drilling mud from flowing to the annulus and/or out of a port 40 located near the annulus to assure that the majority of the mud is pumped through the center 42 of the mandrel 1 to the drill bit and associated bit nozzle, assuming that a maximum amount of hydraulic pressure and flow rate is achieved through the bit to assist in drilling and removing drill cuttings.

The port 40 near the annulus also equalizes the pressure of the sealed bearing pack 30 since it allows some drilling mud to exit the annulus such that the pressure of the drilling mud in the annulus equals the pressure of the lubricating fluid on the other side (lower end) of the piston 13. Additionally, the drilling mud can form a lubricating layer between the inside diameter of the flow sleeve 15 and the outside diameter of the bearing adapter (also called an output shaft adapter) 17. The outside diameter of the flow sleeve 15 has grooves to accommodate seals to form a seal between the flow sleeve 15 and the flow housing 11. In the embodiment shown, the flow sleeve 15 has two grooves to accommodate two seals 16, which may be O-rings or other known seals. Additionally, in some embodiments, the outer part of the flow sleeve 15 may be a different material than the inner part of the flow sleeve 15 or the flow sleeve 15 may have an inner lining. Grooves for seals can be seen in the outer part of the flow sleeve 15. Drilling mud flows under (i.e., through the center) of the flow sleeve 15 between the inner surface of the flow sleeve 15 and the bearing mandrel 1.

The piston 13 slides axially along the rotating bearing mandrel 1 to form a moveable end cap for the lubricating oil fluid. In some embodiments the piston 13 is made of steel, whereas prior art sealed bearing packs used pistons made of cast iron. The piston 13 can typically move about two inches in the axial direction. Because the piston 13 can slide along the rotating bearing mandrel 1, the piston 13 allows the lubricating fluid pressure (on one side of the piston 13) to counterbalance the drilling mud pressure (on the other side of the piston 13). In the embodiment shown, the piston 13 has two inner seals (e.g., axial constraint Kalsi Seals®) 14 and two outer seals (e.g., O-rings) 12 designed to assure that the lubricating fluid is constrained on one side of the piston 13 and the drilling mud is constrained on the upper end of the piston 13. Other embodiments include a third inner seal that is a wiper seal. Still further embodiments may also include a wiper seal as one of the outer seals. Thus, no drilling mud can enter the sealed section with the lubricating fluid and contaminate the sealed bearing chamber, thus assuring improved wear and extended tool life. The piston 13 seals the lubricating fluid within the housings 5, 7, 11 on an upper end of the sealed bearing pack 30. Further, hydrostatic pressure keeps the piston 13 from moving back toward the upper end (i.e., rear-end) of the sealed bearing pack 30. Thus, the piston 13 is locked to the oil side of the pack.

The hub lock 10 is used to provide a constraining force for the off-bottom thrust bearing assembly 9, i.e., provide a stop for the thrust bearing assembly 9 when there is tension on the drilling assembly as the drill bit is lifted off the bottom of the drill hole. The hub lock 10 sits in a groove 58 in the bearing mandrel 1 such that the hub lock 10 cannot move in the axial direction (i.e., in the longitudinal direction of the bearing mandrel). The hub lock 10 keeps the sealed bearing pack 30 together such that components of the sealed bearing pack 30 (including the bearing mandrel 1) do not fall out of the mud motor assembly. Other embodiments of sealed bearing packs can use a split ring instead of a hub lock 10. A three-piece split ring assembly comprises a two-piece split ring (also called snap rings and saver rings), a retainer ring (also called a lock ring), and a snap ring. In some embodiments, the split ring assembly includes a compression nut to provide a stop surface for the thrust bearing like the split ring. In various embodiments, the fit between the mandrel 1 and the hub lock 10 is snug to limit the vibration between the mandrel 1 and the hub lock 10, thereby reducing mandrel 1 failure by cracking.

The adapter housing 7 provides extra radial support for the bearing mandrel 1. The adapter housing 7 increases the overall length of the outer housing by at least about 5" over the prior art versions. Additionally, a bushing or radial bearing 8 (which may be a DU bearing, an MU bearing, or another radial bearing) is positioned concentrically within the adapter housing 7 to provide additional radial support. In prior art sealed bearing packs, the radial bearing was positioned within the lower seal carrier or lower bearing housing. The radial bearing 8 of some embodiments of the present invention is about 8" to 10" long, which is about 5" longer than radial bearings of the prior art. Alternatively, two radial bearings 8 can be used if one long radial bearing 8 cannot be manufactured or if it is cheaper to use two radial bearings instead of one long radial bearing. The combination of the long radial bearing 8 and the adapter housing 7 extend the length of the sealed bearing pack 30 making the sealed bearing pack 30 operate better during lateral/horizontal drilling. The long radial bearing 8 provides increased lateral support. The additional radial support provided by the bearing 8 and adapter housing 7 is especially important for horizontal drilling due to the increased wear experienced by the downhole assemblies during horizontal drilling.

The thrust bearing assemblies 6, 9 allow the mandrel 1 to rotate while retaining the mandrel 1 in a concentric position within the housings 5, 7, 11. The thrust bearing assemblies 6, 9 carry extensive lateral and compressive loads generated during drilling operations. The off-bottom bearing assembly 9 comprises one bearing 9B and two races 9A. The on-bottom bearing assembly 6 comprises one bearing 6B and two races 6A. The off-bottom bearing assembly 9 is positioned within the flow housing 11 and positioned between the hub lock 10 and the upper end of the adapter housing 7. The on-bottom bearing assembly 6 is positioned within the lower bearing housing 5 and positioned between a second shoulder 36 of the bearing mandrel 1 and the lower end of the adapter housing 7. The on-bottom thrust bearing assembly 6 is positioned proximate to the drill bit and lower seals to reduce slap. Slap is the actual clearance between the thrust bearing assembly and the housing, which causes bouncing around or movement of the thrust bearing assembly. Thus, the slap is reduced because the lower end of the adapter housing 7 is positioned adjacent to the upper race 6A in the on-bottom thrust bearing assembly 6. Therefore, there is little clearance between the adapter housing 7 and the on-bottom thrust bearing assembly 6. The on-bottom thrust bearing assembly 6 is positioned about 4" to about 7" closer to the seals of the lower bearing housing 5 than thrust bearing assemblies of the prior art. A snap ring or hub lock is not needed to limit the axial movement of the on-bottom thrust bearing assembly 6 because the thrust bearing assembly 6 is positioned adjacent to the lower end of the adapter housing 7. Thus, the adapter housing 7 acts like a clamp or stop to prevent axial movement by the thrust bearing assembly 6. Having two thrust bearing assemblies (an off-bottom thrust bearing assembly 9 and an on-bottom thrust bearing assembly 6) rather than one bearing assembly that acts as both the on-bottom and off-bottom bearing assemblies increases the life of the bearing assemblies, which means less failures during operation. The on-bottom and off-bottom bearing assemblies 6, 9 can be the same type of bearing assemblies. However, in some embodiments, the off-bottom thrust bearing assembly 9 has a different load rating than the on-bottom thrust bearing assembly 6 because each thrust bearing assembly 6, 9 experiences different amounts of loads throughout the drilling process. Typically, the off-bottom thrust bearing assembly 9 experiences lower loads and is thus sized for the lower loads. Further, the inner and outer diameters of the on-bottom and off-bottom thrust bearing assemblies 6, 9 may be different from one another due to the different inner diameters of the outer housing or the different outer diameters of the bearing mandrel at the locations of the on-bottom and off-bottom thrust bearing assemblies 6, 9.

The lower bearing housing 5 is merely a structural housing designed to retain one or more seals and the on-bottom thrust bearing assembly 6. The lower bearing housing 5 seals the lubricating fluid within the housings 5, 7, 11 on a lower end of the sealed bearing pack 30 and thus keeps the drilling mud and inherent contamination out of the housings 5, 7, 11. In some embodiments, the lower bearing housing 5 has three grooves for three seals: one PolyPak seal 2 and two wide-footprint seals 3 (e.g., Kalsi Seals®). In one embodiment, the lower bearing housing 5 has two or more holes or openings 32 near the lower end (proximate the drill bit) of the lower bearing housing 5. These openings 32 allow for oil passage, e.g., to fill the sealed bearing pack with lubricating fluid. In some embodiments, the lower bearing housing 5 can have five openings 32: one opening 32 between each seal on a top side of the sealed bearing pack, one opening 32 between each seal on a bottom side of the sealed bearing pack, and one opening 32 above the upper most seal in the lower bearing housing 5. In one embodiment, these openings 32 are plugged with NPT plugs (¼" or ⅜") to keep the openings 32 closed while drilling.

FIGS. 3A-38C include exemplary dimensions. Unless otherwise specified, all of the dimensions are inches and the angles are degrees. In some embodiments, the dimensions can range +/−0.50 inches from the dimensions shown in the drawings. In preferred embodiments, the dimensions range +/−0.25 inches from the dimensions shown in the drawings. In more preferred embodiments, the dimensions range +/−0.10 inches from the dimensions shown in the drawings. In most preferred embodiments, the dimensions are as shown in FIGS. 3A-38C. Furthermore, the same component numbers are used throughout FIGS. 3A-38C such that repetitive description is not included herein. Thus, for example, the description of FIGS. 3A-E corresponds to the description of FIGS. 12A-D such that the description of FIGS. 12A-D is shorter and does not repeat information provided for FIGS. 3A-E.

FIGS. 3A-11E show components of one embodiment of a 5-inch sealed bearing pack, meaning its outer diameter is 5.00 inches. Sealed bearing pack can be different sizes, including 5.00 inches, 6.50 inches, 6.75 inches, 7.00 inches, 8.00 inches, etc. See the embodiments shown in FIGS. 12A-20C, which show the components of a 6.50-inch sealed bearing pack. See the embodiments shown in FIGS. 21A-29C, which show the components of a 7.00-inch sealed bearing pack. See the embodiments shown in FIGS. 30A-38C, which show the components of a 8.00-inch sealed bearing pack.

Figure 3B:
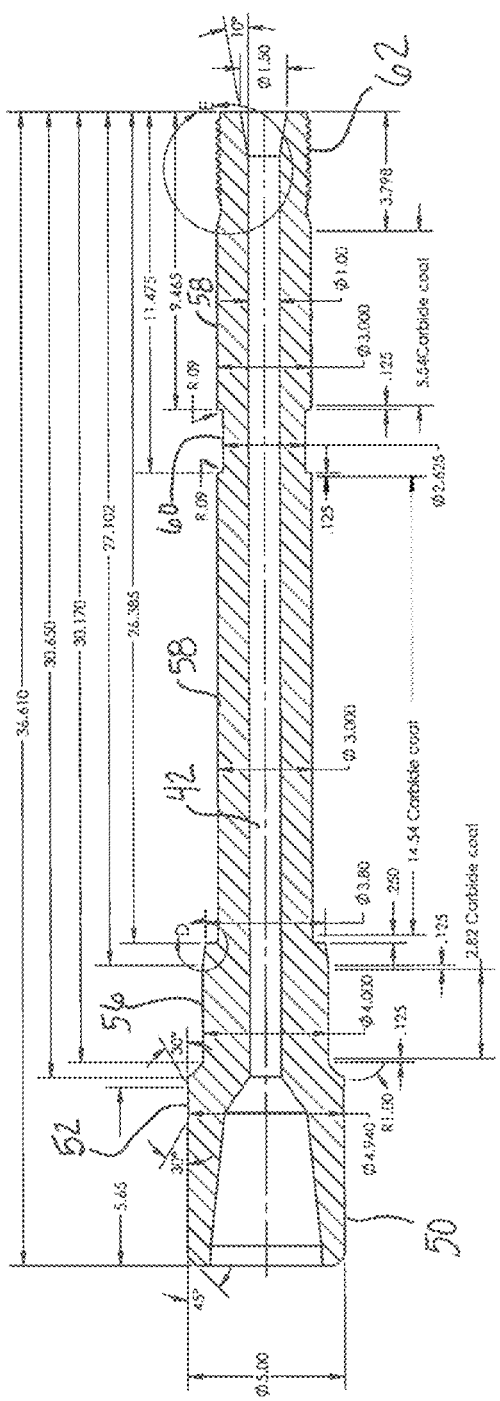
Figure 3E:
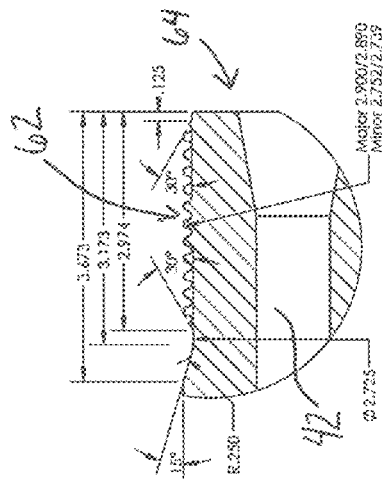
Figure 3D:
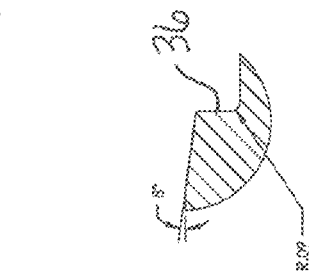
Figure 3A:
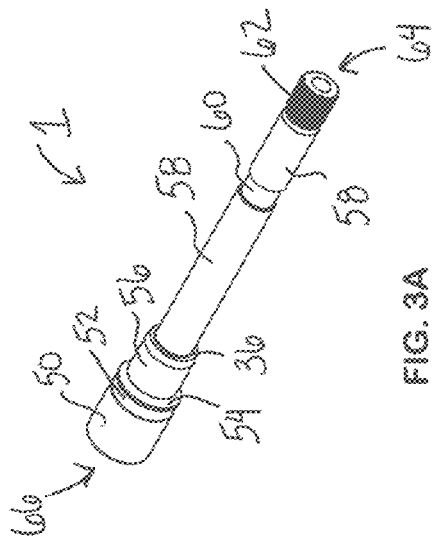

FIGS. 3A-E show one embodiment of a bearing mandrel 1. The bearing mandrel 1 has a first outer surface 50 proximate the lower end 66 that includes a first notch 52 for an ID band. The first outer surface 50 has a first outer diameter and terminates in a first shoulder 54 interconnected to a second outer surface 56 terminating in a second shoulder 36. The first shoulder 54 has a rounded shape to reduce stress on the bearing mandrel 1. The second outer surface 56 has a second outer diameter that is smaller diameter than the first outer diameter of the first outer surface 50. The second shoulder 36 is interconnected to a third outer surface 58 of the bearing mandrel 1. The third outer surface 58 has a third outer diameter that is smaller diameter than the second outer diameter of the second outer surface 56 and includes a second notch 60. The hub lock or split ring is positioned in the second notch 60 of the bearing mandrel 1. The third outer surface 58 can have a carbide coating. The bearing mandrel 1 has a threaded portion 62 proximate the upper end 64 of the bearing mandrel 1. The threaded portion 62 may be 6P DIN 405 round threads. FIG. 3A is a perspective view of the bearing mandrel 1. FIG. 3B is a top plan view of the lower end 66 of the bearing mandrel 1. FIG. 3C is a cross-sectional view of the bearing mandrel 1 taken along cut C-C of FIG. 3B. FIGS. 3D and 3E are enlarged portions of FIG. 3C. The angle shown in FIG. 3D is provided for the lubricating fluid and the flow of the lubricating fluid. The bearing mandrel 1 is a 4340 HT material in one embodiment.

Figure 4B:
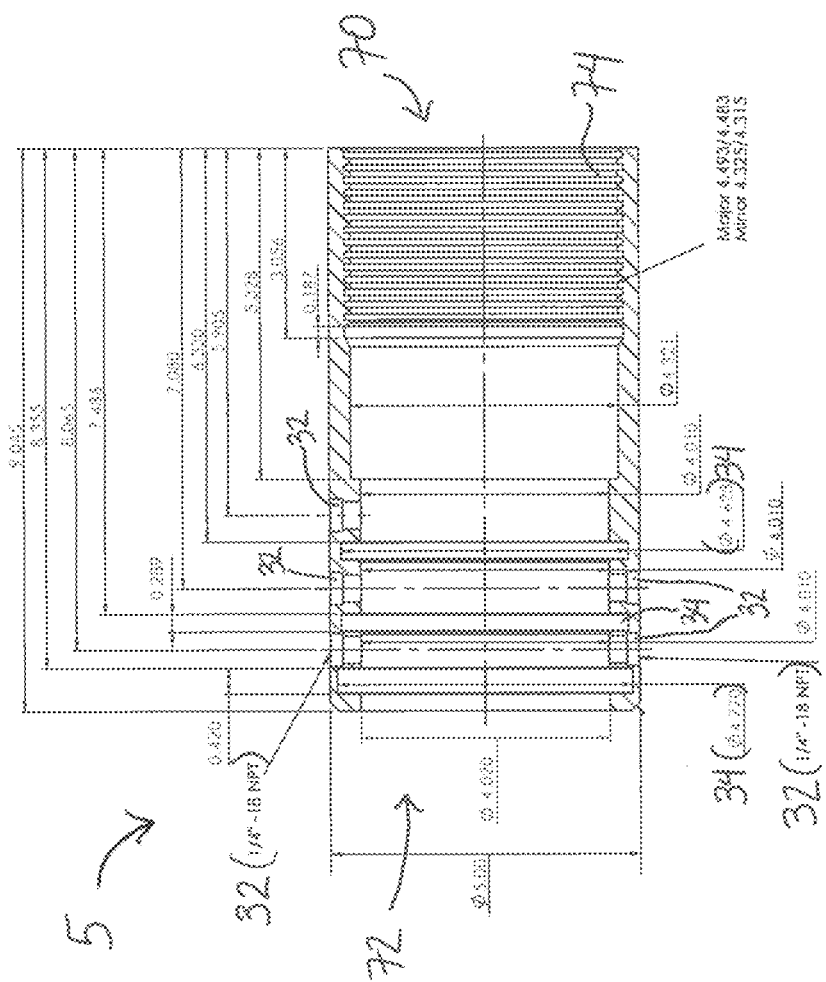
FIGS. 4A-4B show a lower bearing housing according to one embodiment.
Figure 4A:
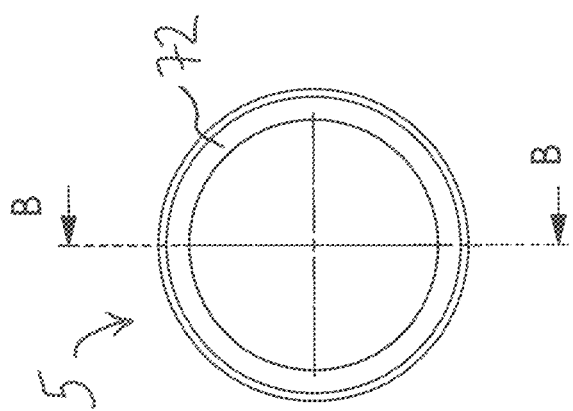

FIGS. 4A-4B show a lower bearing housing 5 according to one embodiment. FIG. 4A is a top plan view the lower end 72 of the lower bearing housing 5. FIG. 4B is a cross-sectional view of the lower bearing housing 5. The lower bearing housing 5 has a lower end 72 and an upper end 70. The inner surface of the lower bearing housing 5 includes threads 74 proximate the upper end 70 to interconnect with the adapter housing 7. The lower bearing housing 5 has grooves 34 for seals. The seals may include a Kalsi seal, a PolyPak seal, and/or an O-ring. In one embodiment, the seals include one PolyPak seal and two Kalsi seals. In another embodiment, the seals include one PolyPak seal, two Kalsi seals, and one O-ring. The lower bearing housing 5 also includes three or more openings 32 for lubricating fluid. In the embodiment shown, the lower bearing housing 5 has five openings 32 such that there is an opening 32 between the seals. These additional openings allow additional lubricating fluid to be put into the lower bearing housing 5 and ensure that the seals remain lubricated throughout the drilling process. The extra openings 32 ensure that each seal receives lubricating fluid. The openings 32 can be closed using threaded plugs such that drilling mud and other debris does not enter the sealed section of the sealed bearing pack during drilling operations. The openings 32 are positioned 180 degrees apart from one another. The 5.00" sealed bearing pack is usually used for Balkan drilling, which is hard drilling. Therefore, the seals must remain lubricated and, thus, the lower bearing housing 5 needs extra openings for additional lubricating fluid to keep the seals lubricated. The lower bearing housing 5 may include a DU bearing for additional support.

Figure 5A:
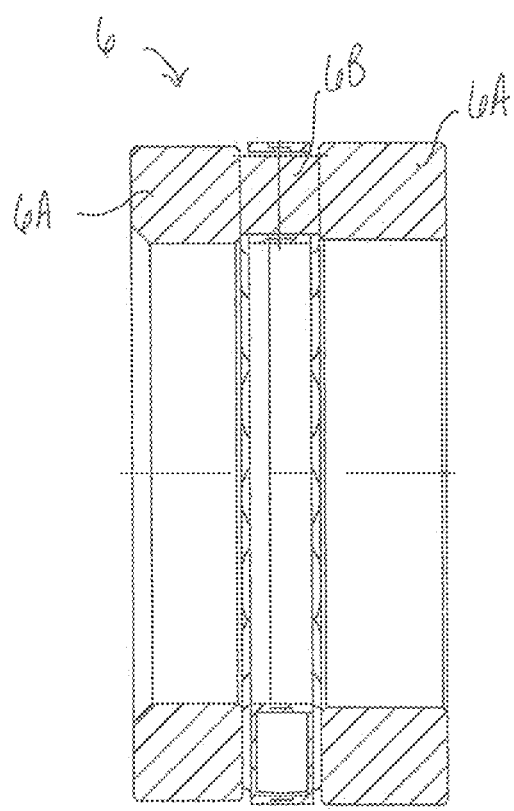
FIG. 5A shows one embodiment of an on-bottom thrust bearing assembly.

FIG. 5A shows one embodiment of an on-bottom thrust bearing assembly. The on-bottom thrust bearing assembly 6 comprises two races 6A on either side of a thrust bearing 6B. When drilling with the mud motor, most of the weight of the mud motor is on the on-bottom thrust bearing assembly 6.

Figure 5B:
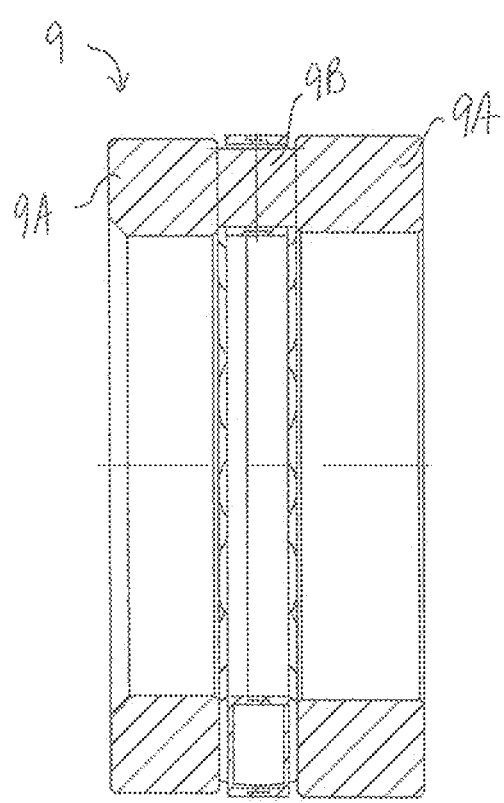
FIG. 5B shows one embodiment of an off-bottom thrust bearing assembly.

FIG. 5B shows one embodiment of an off-bottom thrust bearing assembly 9. The off-bottom thrust bearing assembly 9 comprises two races 9A on either side of a thrust bearing 9B. When pulling the mud motor out of the wellbore, most of the weight of the mud motor is on the off-bottom thrust bearing assembly 9.

Figure 6A:
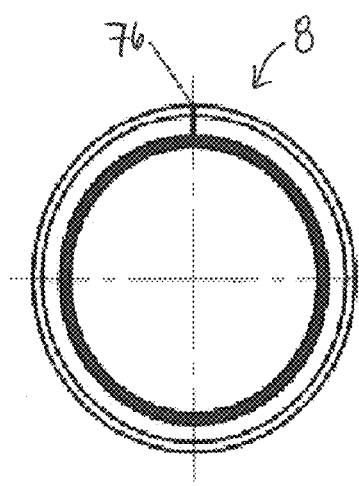
FIGS. 6A-6B show one embodiment of a radial bearing.
Figure 6B:
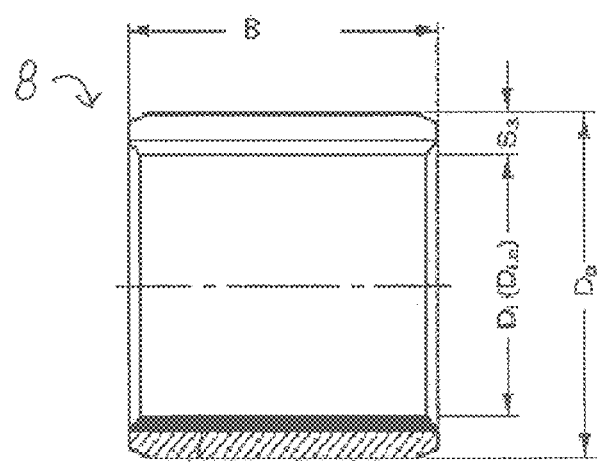

FIGS. 6A and 6B show one embodiment of a radial bearing 8. Specifically, the radial bearing 8 shown is a DU bearing with a bush joint 76, a length B of between about 3.00 inches and 5.00 inches, an inner diameter $D_i$ of 3.00 inches, an outer diameter $D_o$ of 3.186 inches, and a thickness $S_3$ of about 0.5 mm. In some embodiments the DU bearing 8 has a Teflon coating. The radial bearing 8 is sized to the bearing mandrel with 0.001 inch of clearance. The radial bearing 8 acts like a liner between the bearing mandrel 1 and the adapter housing 7 such that the radial bearing 8 wears out before the bearing mandrel 1 or the adapter housing 7 and the radial bearing 8 can easily be replaced once it is worn out. In some embodiments, two radial bearings 8 are used and are positioned end to end to provide even more radial support. Alternatively, an extra long radial bearing 8 could be used.

FIGS. 7A-F show one embodiment of a hub lock. The hub lock includes an outer collar 90 (FIGS. 7D-F) and a split collar 78 (FIGS. 7A-C) comprising two semi-cylindrical halves, which may have annular grooves in their inner surfaces. The machined grooves engage into annular recesses formed on the surface of the bearing mandrel. The split collar 78 has a lip 84 encircling split collar 78 and the lip has a plurality of cylindrical holes 80 positioned around the lip 84. In one embodiment, the split collar 78 has twelve through holes 80. The split collar 78 includes a front (also called lower) surface 82, a cylindrical portion 86, and a rear surface 88.

The outer collar 90 of the hub lock includes a plurality of cylindrical holes 92 positioned around the outer collar 90, an inn surface 98, a front (also called lower) surface 94, and a rear surface 96. When the hub lock is assembled, the holes 80 in the lip 84 of the split collar 78 align with the holes 92 of the outer collar 90 and screws are screwed into the holes 80, 92 to interconnect the split collar 78 and outer collar 90. The screws or other fastening mechanism are positioned along the longitudinal axis of the sealed bearing pack. In one embodiment, the fastening mechanisms are positioned with their heads oriented toward the upper end of the sealed bearing pack and their threaded portions oriented toward the lower end of the sealed bearing pack. Additionally, the inner surface 98 of the outer collar 90 is positioned around and adjacent to the cylindrical portion 86 of the split collar 78 when the hub lock is assembled. In one embodiment, the hub lock includes 12 bolts positioned on a wedge-like portion, which creates a seat area for the off-bottom thrust bearing assembly. The hub lock is more robust than two-piece split rings and three-piece split ring assemblies of prior art sealed bearing packs.

Figure 7B:
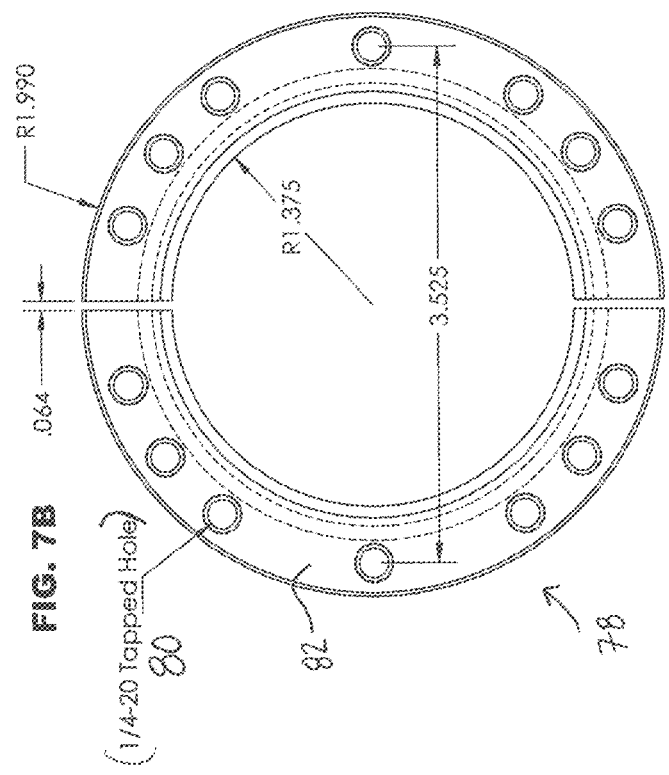
Figure 7C:
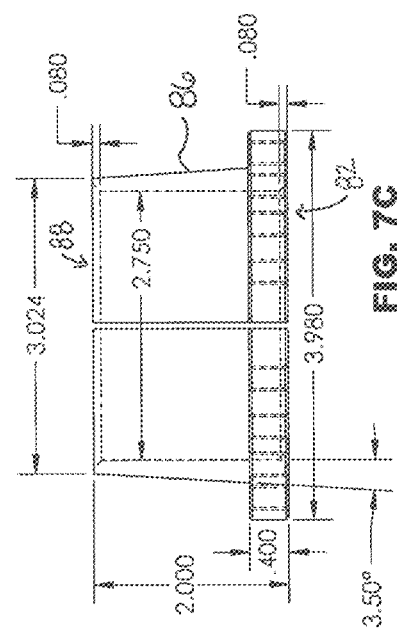
Figure 7A:
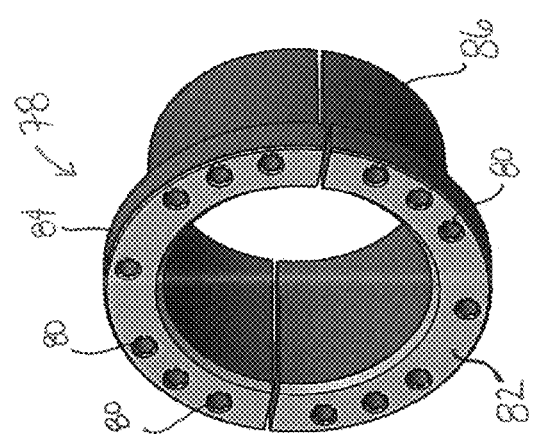
Figure 7G:
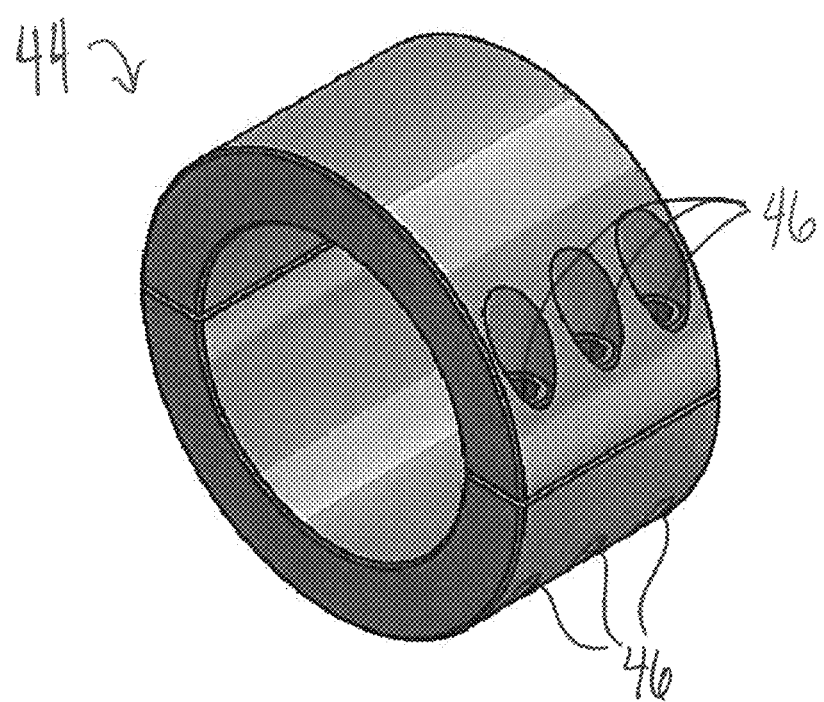
FIG. 7G shows a two-piece split ring.

Alternative embodiments of the sealed bearing pack use a two-piece split ring 44 as shown in FIG. 7G. The split ring 44 includes a plurality of holes positioned 180 degrees apart and positioned perpendicular to the longitudinal axis of the sealed bearing pack. The fastening mechanisms are inserted into the holes to interconnect the two pieces. The split ring 44 can be comprised of 4340 steel with a black oxide finish.

FIGS. 8A-B show one embodiment of a flow housing 11. The various outer diameters of the flow housing and the openings 38, 40 can be seen in FIGS. 8A-B. The inner surface of the lower end 114 of the flow housing 11 includes threads 110 and the inner surface of the upper end 116 of the flow housing 11 includes threads 112. The flow housing includes at least one opening 38 for lubricating fluid and at least 4 holes 40 positioned 90 degrees apart for drilling mud.

FIGS. 9A-B show one embodiment of a flow sleeve 15. The flow sleeve 15 is positioned within the flow housing 11. The flow sleeve 15 is longer than flow sleeves in prior art sealed bearing packs. The flow sleeve 15 is between about 8 inches long and 14 inches long in various embodiments. In a preferred embodiment, the flow sleeve 15 is between about 10 inches long and 12 inches long. The flow sleeve 15 is a one-piece flow sleeve and is carbide in one embodiment. In another embodiment, the flow sleeve 15 includes an outer surface that is carbide. The carbide outer surface may be a shrink-to-fit carbide wrap that is wrapped around the flow sleeve 15. Using a carbide wrap on the outer surface of the flow sleeve 15 can increase the life of the sealed bearing pack by up to about 50%. The outer surface of one end of the flow sleeve 15 has a finish of between about 8 microns and 10 microns and the outer surface of the other end of the flow sleeve 15 has a finish of between about 16 microns and 30 microns. The inner surface of the flow sleeve 15 has a smooth surface on the portion that engages the seals of the piston. The outer surface of the flow sleeve 15 includes at least two grooves 120 for seals. The seals may be Kalsi seals, PolyPak seals, or O-rings. The flow sleeve 15 also includes four openings 122 for drilling mud positioned 90 degrees apart and aligned with the openings 40 for drilling mud in the flow housing 11. The flow sleeve 15 is also selectively removable, unlike flow sleeves of the prior art that were not removable. Having a removable flow sleeve 15 allows the operator to replace the flow sleeve 15 if the flow sleeve has worn down during operation. A replaceable flow sleeve 15 can save time and money during the drilling operation because only the flow sleeve 15, and not the entire flow housing 11 or other components, can be replaced or repaired.

Figure 10A:
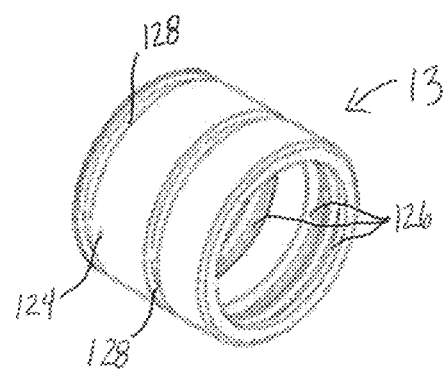
FIGS. 10A-10C show one embodiment of a piston.
Figure 10B:
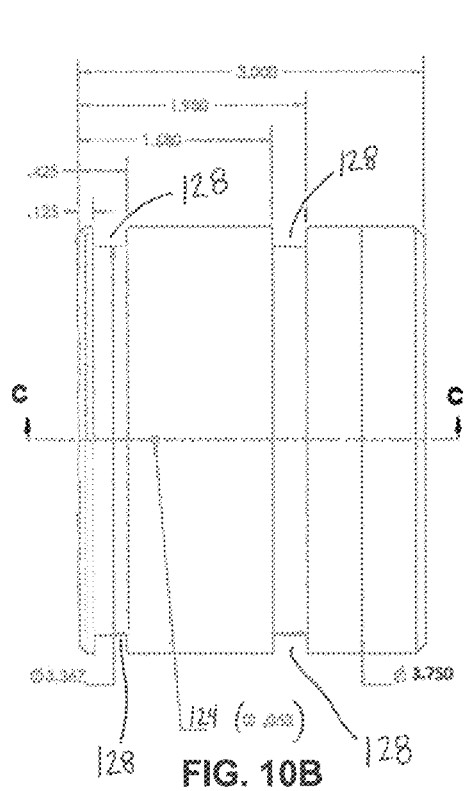
Figure 10C:
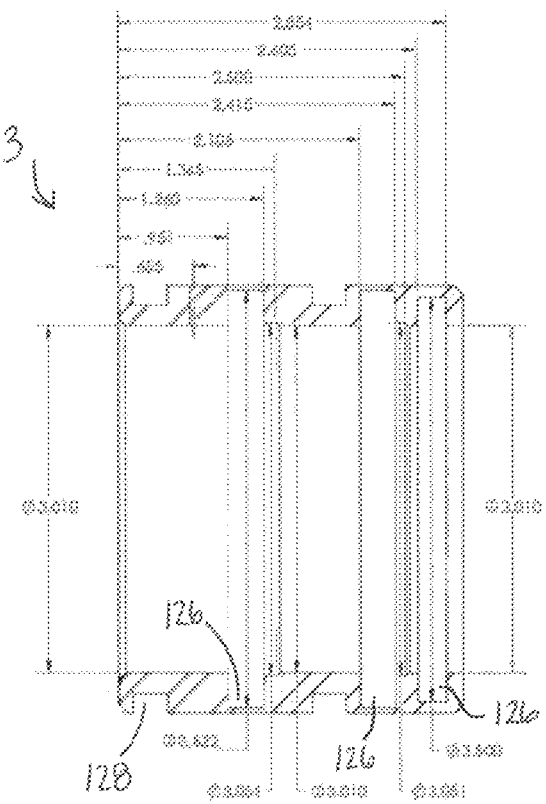

FIGS. 10A-C show one embodiment of a piston 13. The piston includes at least one opening 124 (which may be a weep hole), grooves 128 in the outer surface for seals, and grooves 126 in the inner surface for seals. The embodiment shown includes two grooves 128 in the outer surface and three groove 126 in the inner surface. The seals in the outer surface of the piston 13 are called static seals because they remain fixed in the piston 13. Typically the seals in the outer surface are O-rings, although a wiper seal may be used proximate the rear end of the piston 13 in some embodiments. The wiper seal keeps the debris out of the sealed section (i.e., lubricated section) of the sealed bearing pack because the mud and debris is proximate the rear end of the piston 13. In seals on the inner surface of the piston 13 generally include two Kalsi seals and a wiper seal proximate the rear end of the piston 13.

FIGS. 11A-E show one embodiment of a bearing adapter 17. FIG. 11A is a top plan view of the lower end 130 of the bearing adapter 17. FIG. 11E is a plan view of the upper end 132 of the bearing adapter 17. FIGS. 11B, 11C, and 11D are sectional views of the bearing adapter 17. The outer surface of the bearing adapter 17 can have a carbide coating. The upper end 132 of the bearing adapter 17 interconnects to the drive shaft. The geometer of the upper end 132 is to accommodate the rollers and rubber sleeve of the drive shaft and to accommodate angles for directional drilling.

Figures 21A, 21B, 21C:
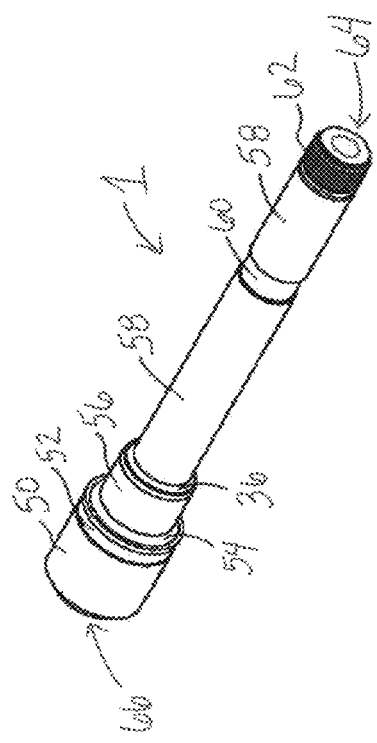
FIGS. 21A-21C show a bearing mandrel according to another embodiment.
Figure 30A:
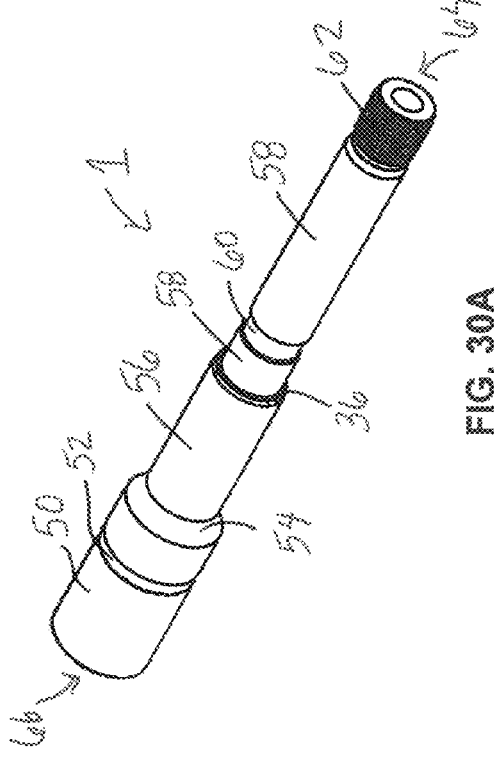
FIGS. 30A-30C show a bearing mandrel according to another embodiment.
Figure 30C:
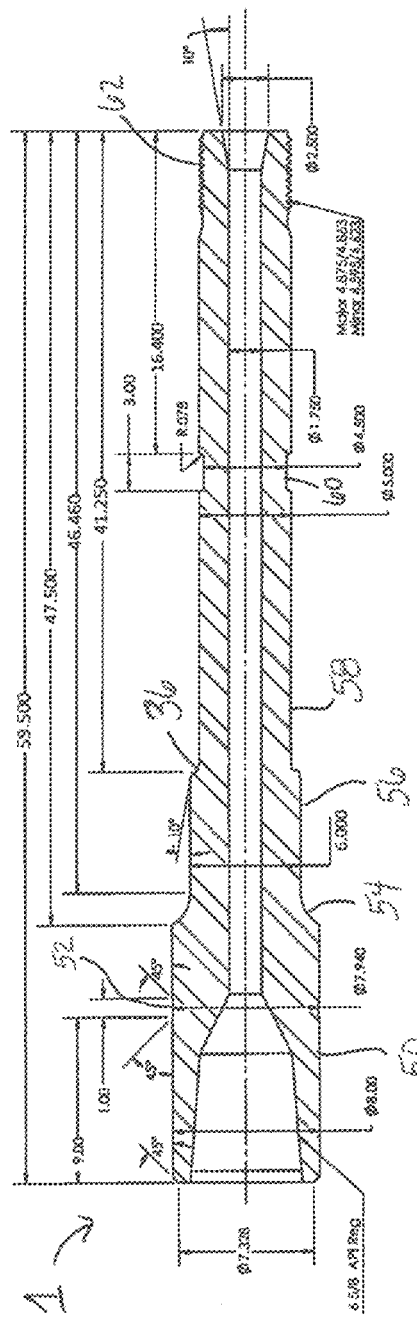
Figure 30B:
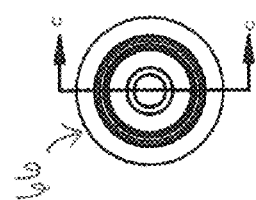

FIGS. 12A-D show a bearing mandrel 1 according to another embodiment. FIGS. 21A-C show a bearing mandrel 1 according to another embodiment. FIGS. 30A-C show a bearing mandrel 1 according to another embodiment.

Figures 13A, 13B:
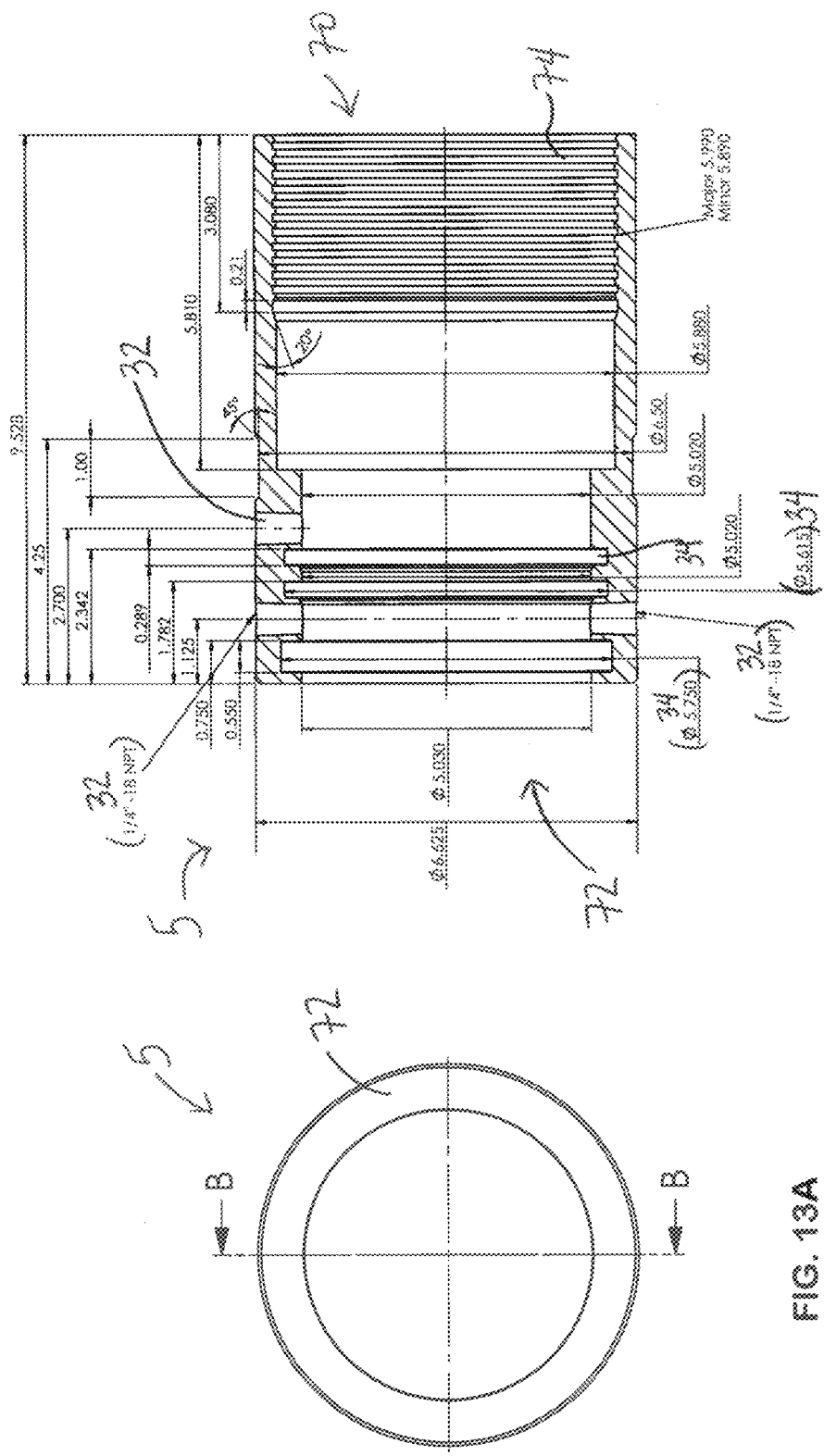
FIGS. 13A-13B show a lower bearing housing according to another embodiment.
Figure 22B:
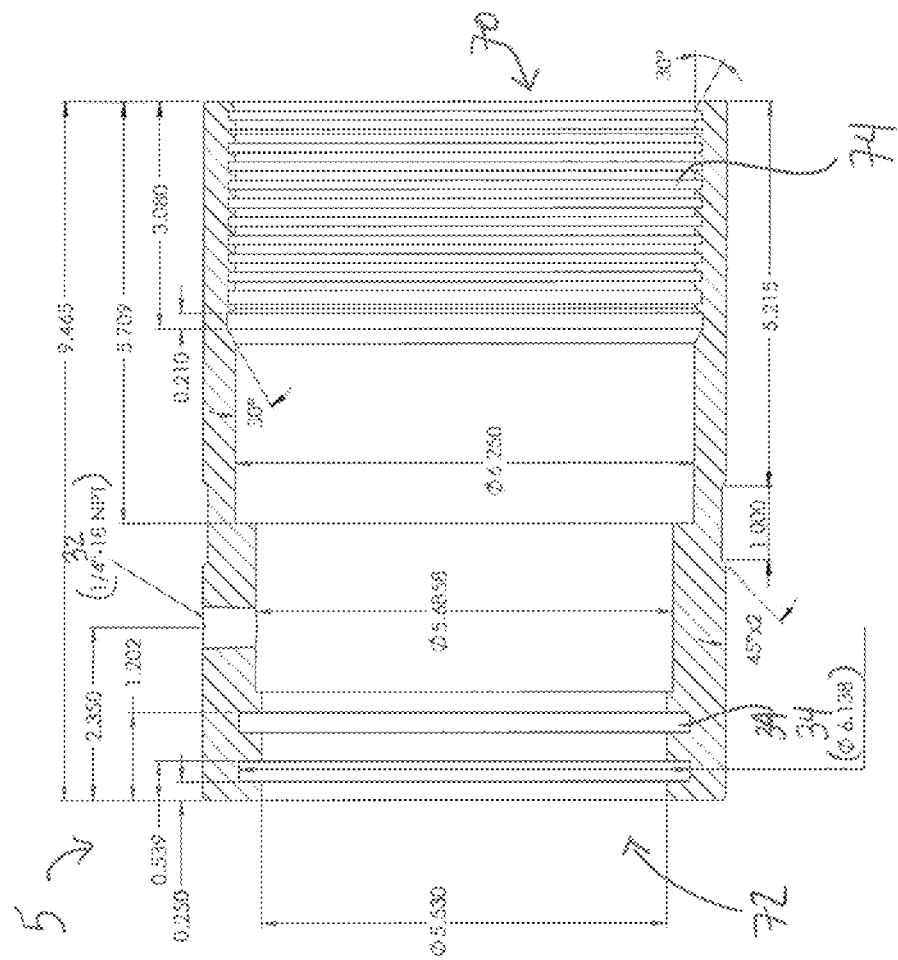
FIGS. 22A-22B show a lower bearing housing according to another embodiment.
Figure 22A:
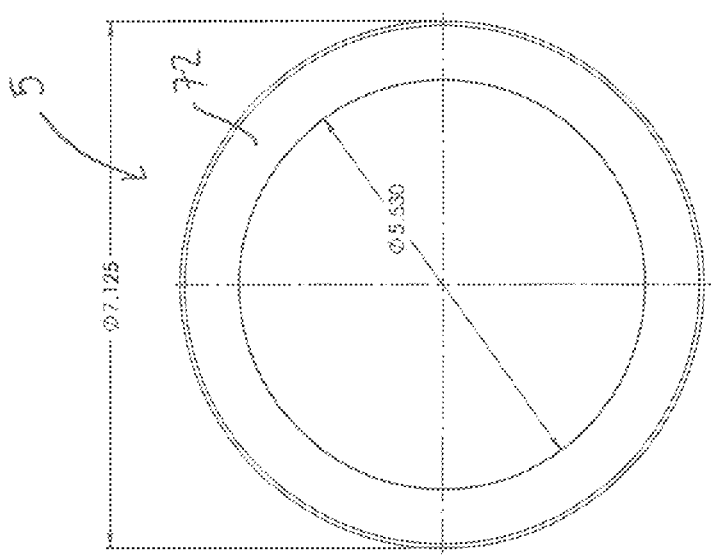

FIGS. 13A-13B show a lower bearing housing 5 according to another embodiment. FIGS. 22A-22B show a lower bearing housing 5 according to another embodiment. FIGS. 31A-31B show a lower bearing housing 5 according to another embodiment. The lower bearing housing 5 may include two Kalsi seals, two holes 32, and one DU bearing.

Figure 14:
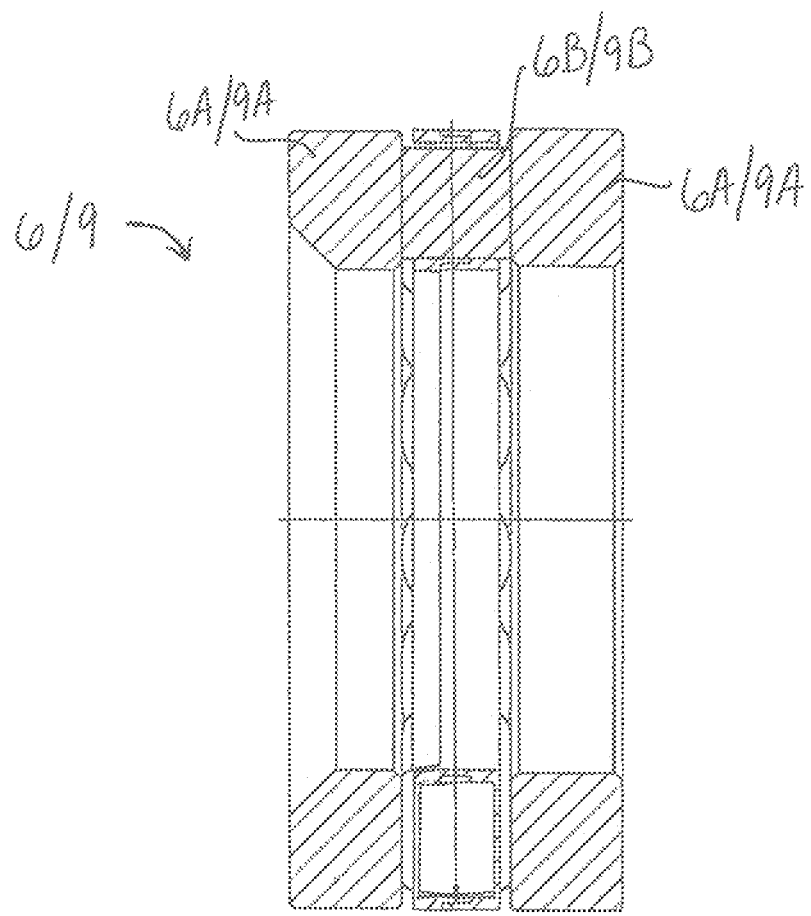
FIG. 14 shows one embodiment of a thrust bearing assembly.
Figure 23:
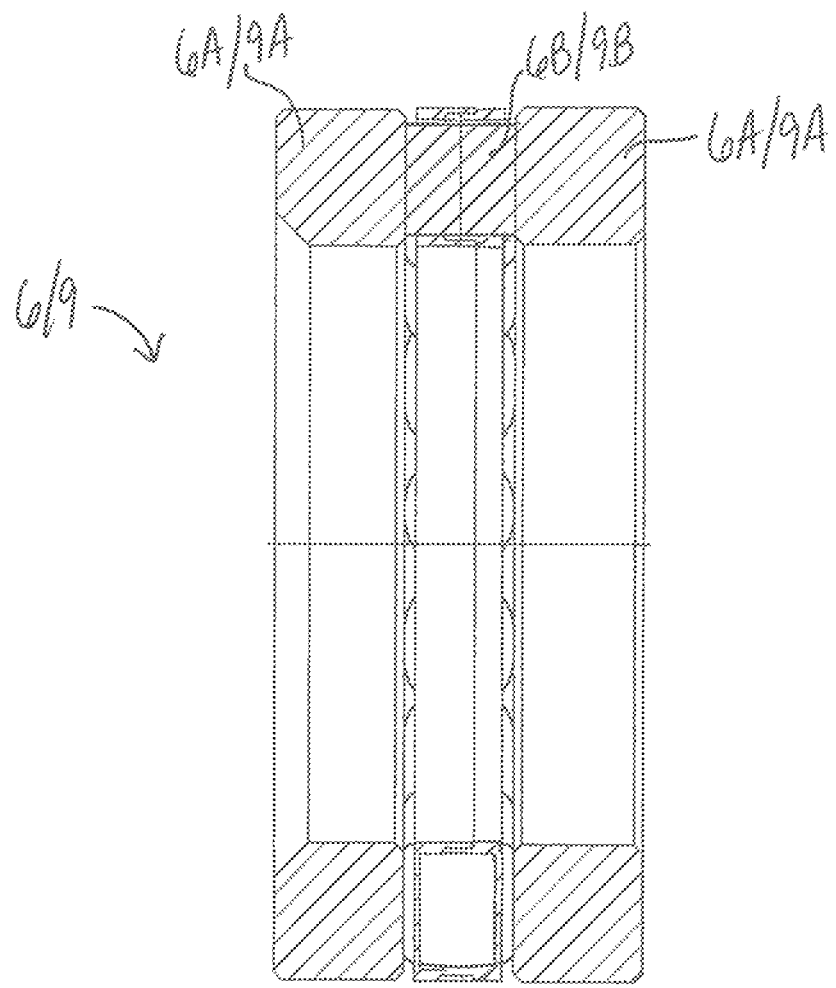
FIG. 23 shows one embodiment of a thrust bearing assembly.
Figure 32:
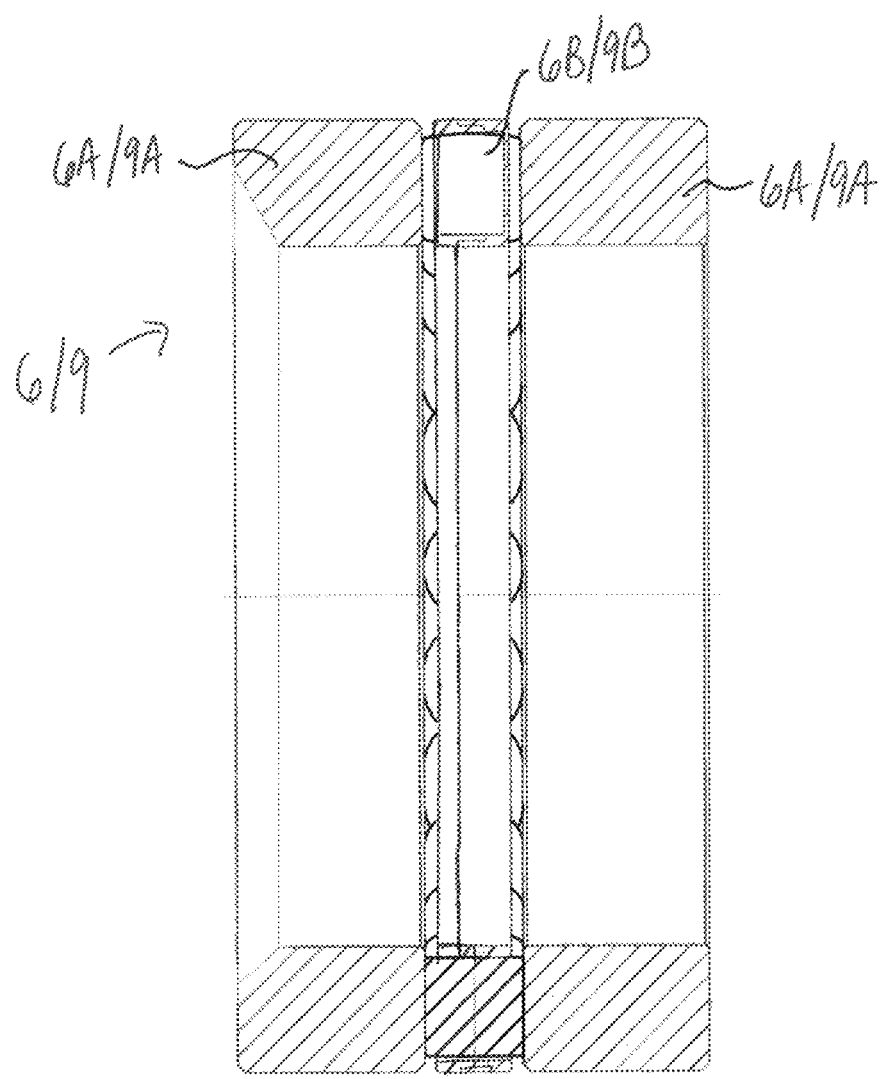
FIG. 32 shows another embodiment of a thrust bearing assembly.

FIG. 14 shows one embodiment of an on-bottom thrust bearing assembly 6 or an off-bottom thrust bearing assembly 9. The on-bottom thrust bearing assembly 6 comprises two races 6A on either side of a thrust bearing 6B. The off-bottom thrust bearing assembly 9 comprises two races 9A on either side of a thrust bearing 9B. FIG. 23 shows one embodiment of an on-bottom thrust bearing assembly 6 or an off-bottom thrust bearing assembly 9. FIG. 32 shows one embodiment of an on-bottom thrust bearing assembly 6 or an off-bottom thrust bearing assembly 9.

Figure 15B:
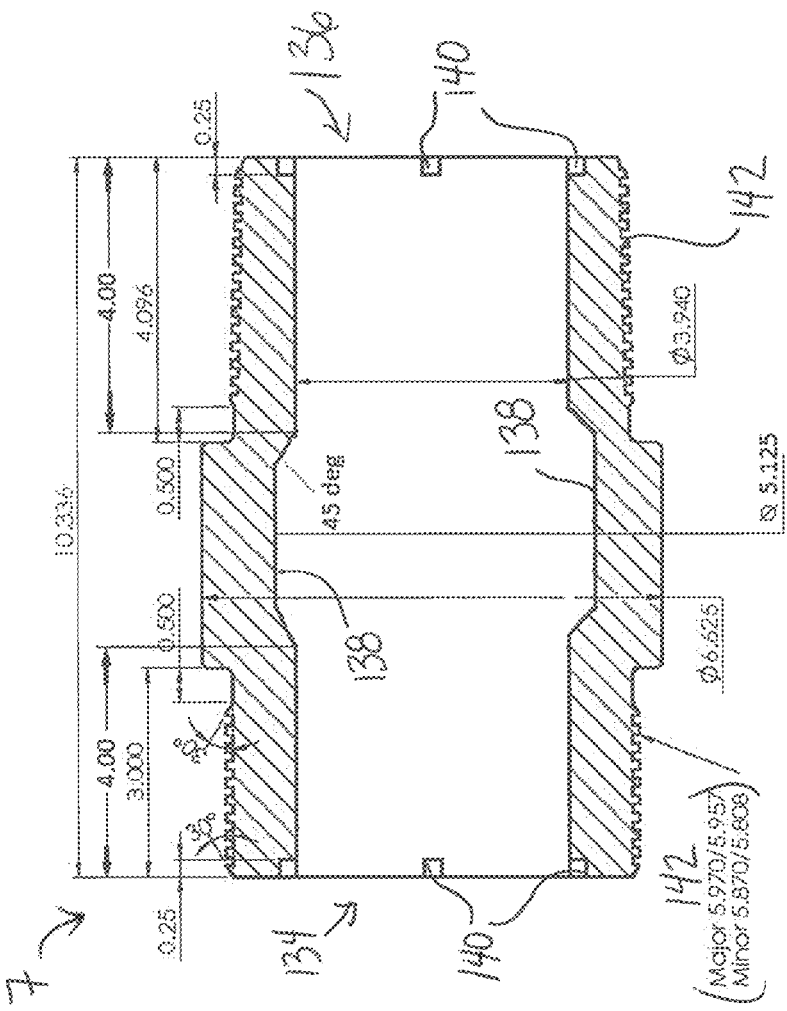
FIGS. 15A-15B show one embodiment of an adapter housing.
Figure 15A:
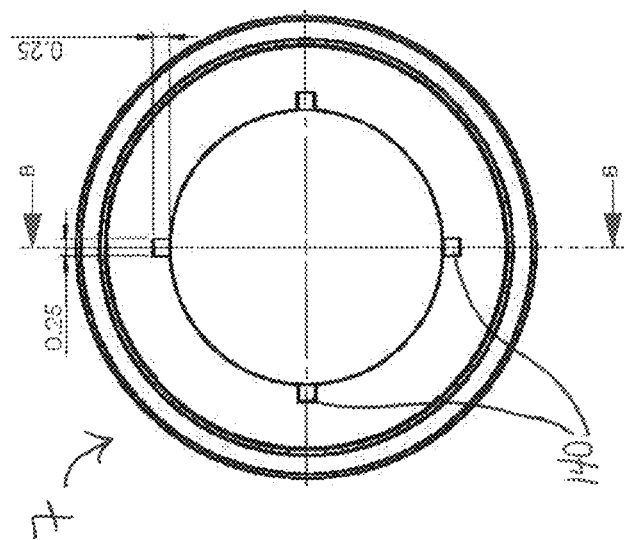
Figure 33B:
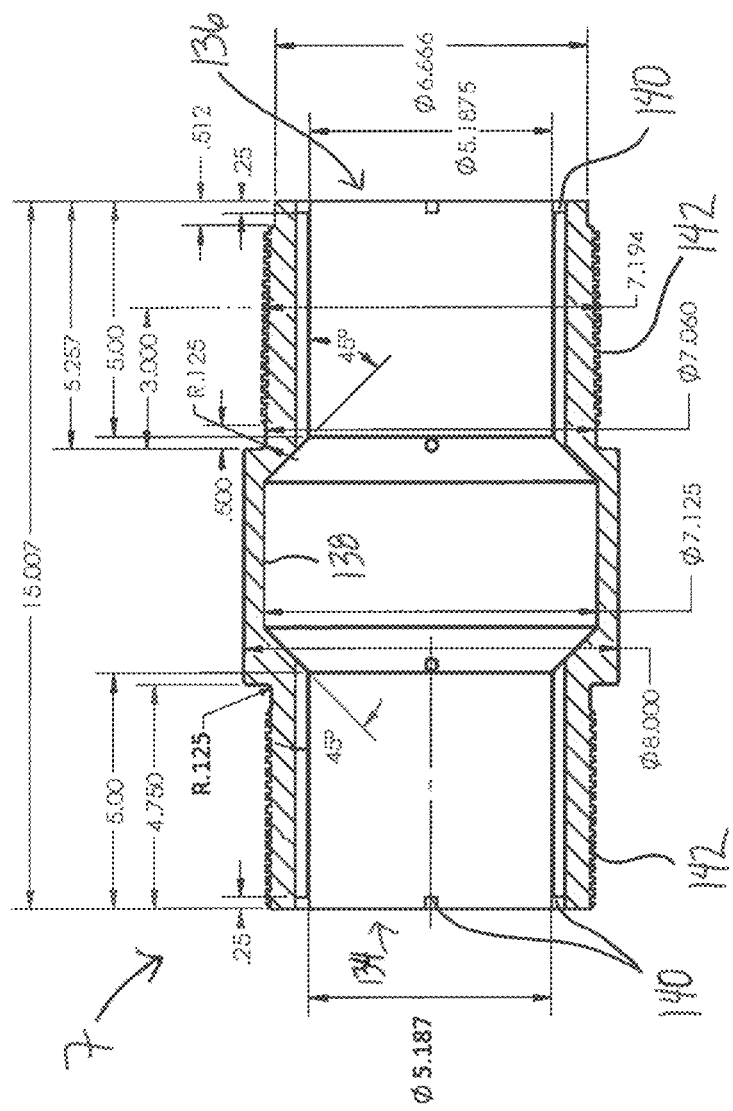
FIGS. 33A-33B show another embodiment of an adapter housing.
Figure 33A:
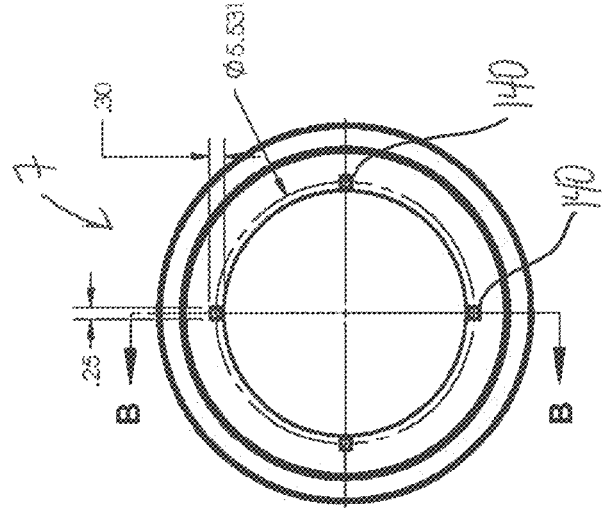

FIGS. 15A-B show one embodiment of an adapter housing 7. The upper end 136 of the adapter housing 7 is threaded 142 to engage and interconnect to the lower end of the flow housing. The lower end 134 of the adapter housing 7 is threaded 142 to engage and interconnect to the upper end of the lower bearing housing. This will allow only about 0.040 inches of clearance for axial movement. The adapter housing 7 also includes an oil reservoir cutout 138 to increase the volume of the oil reservoir. The adapter housing 7 also includes mill slots 140 positioned 90 degrees apart from one another. The milled slots 140 are oil passages and can be broached also. FIGS. 24A-B show an alternative embodiment of an adapter housing 7, which may also include two DU bearings. FIGS. 33A-B show an alternative embodiment of an adapter housing 7, which may also include two DU bearings.

Figure 16A:
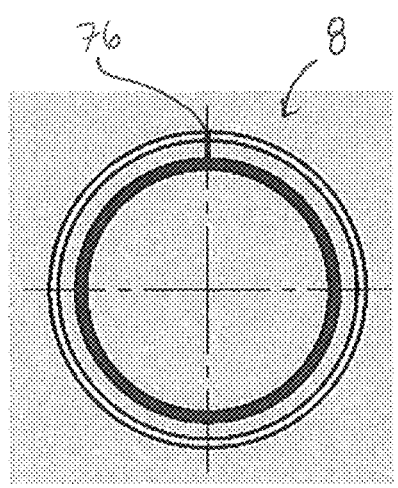
FIGS. 16A-16B show another embodiment of a radial bearing.
Figure 16B:
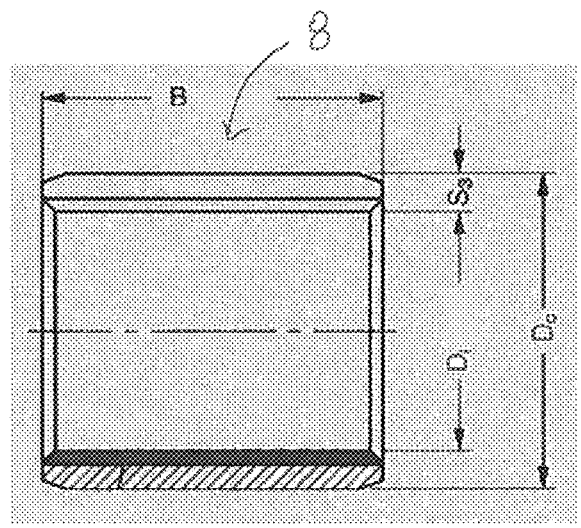
Figure 17:
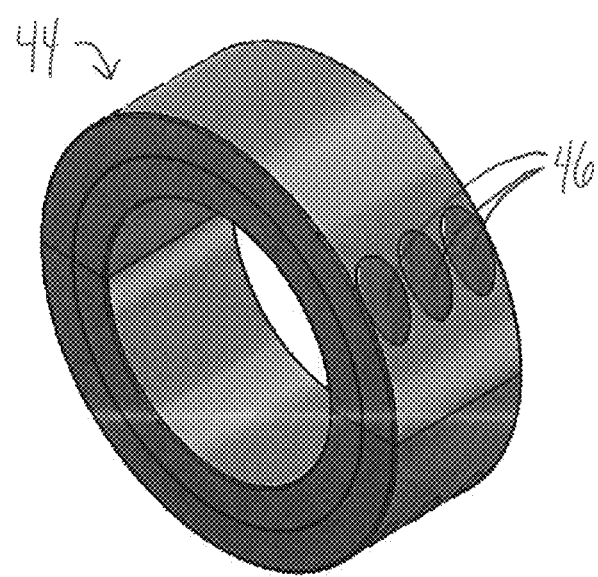
FIG. 17 shows a two-piece split ring.
Figure 25B:
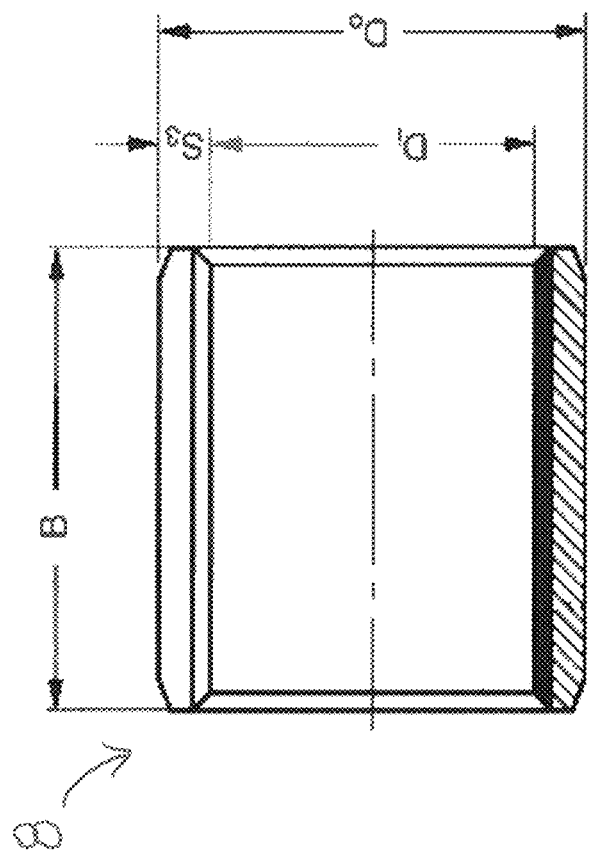
FIGS. 25A-25B show another embodiment of a radial bearing.
Figure 25A:
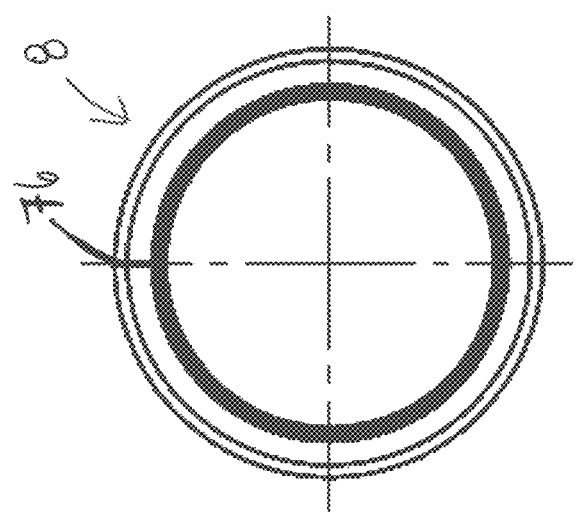

FIGS. 16A and 16B show another embodiment of a radial bearing 8. Specifically, the radial bearing 8 shown is a DU bearing with a bush joint 76, a length B of between about 3.75 inches and 5.75 inches, an inner diameter $D_i$ of 3.75 inches, an outer diameter $D_o$ of 3.936 inches, and a thickness $S_3$ of about 0.5 mm. FIGS. 25A and 25B show another embodiment of a radial bearing. Specifically, the radial bearing 8 shown is a DU bearing with a bush joint 76, a length B of between about 4.25 inches and 6.25 inches, an inner diameter $D_i$ of 4.25 inches, an outer diameter $D_o$ of 4.436 inches, and a thickness $S_3$ of about 0.5 mm. FIGS. 34A and 34B show another embodiment of a radial bearing. Specifically, the radial bearing 8 shown is a DU bearing with a bush joint 76, a length B of between about 3.00 inches and 5.00 inches, an inner diameter $D_i$ of 3.00 inches, an outer diameter $D_o$ of 3.186 inches, and a thickness $S_3$ of about 0.5 mm.

Figure 26B:
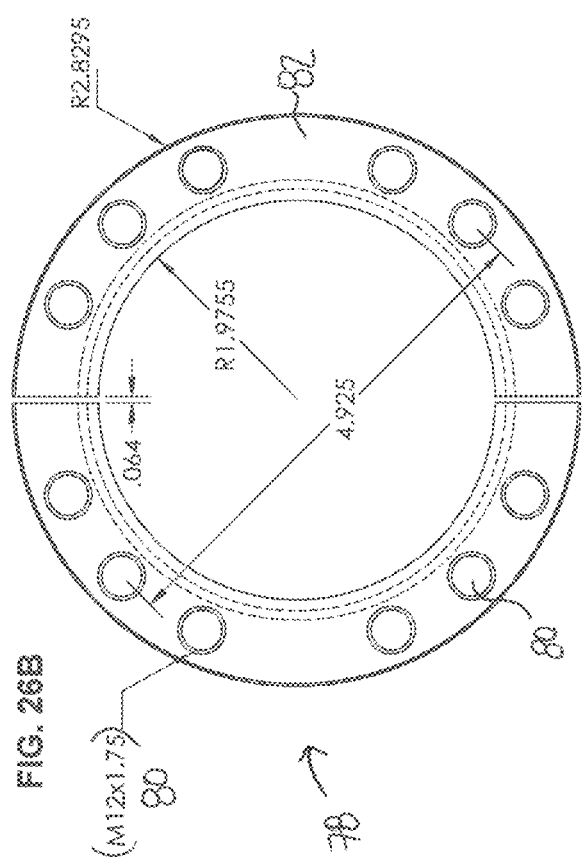
FIGS. 26A-26F show another embodiment of a hub lock.
Figure 26C:
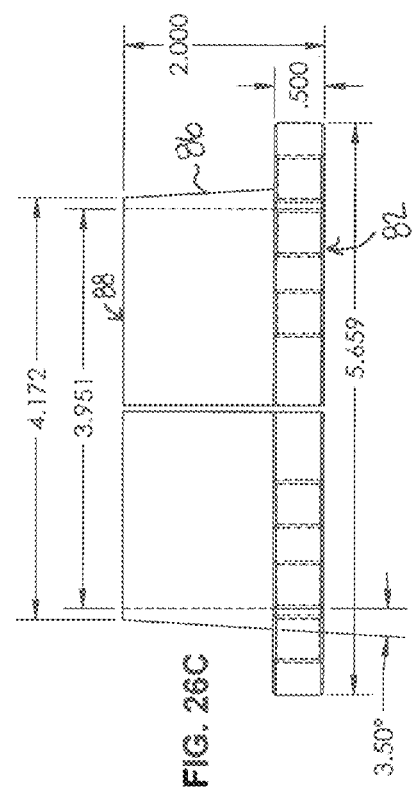
Figure 26A:
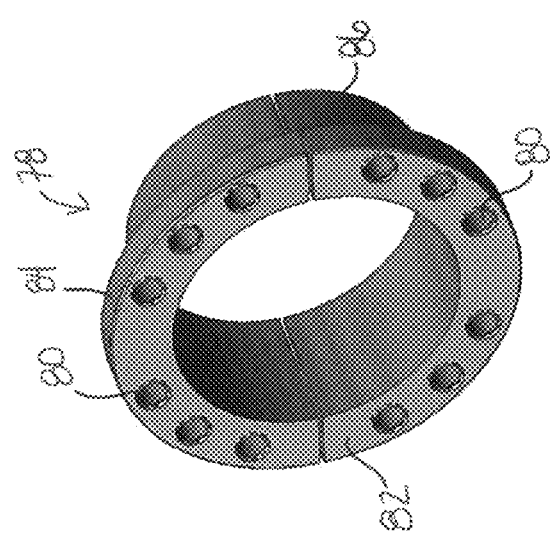
Figure 26E:
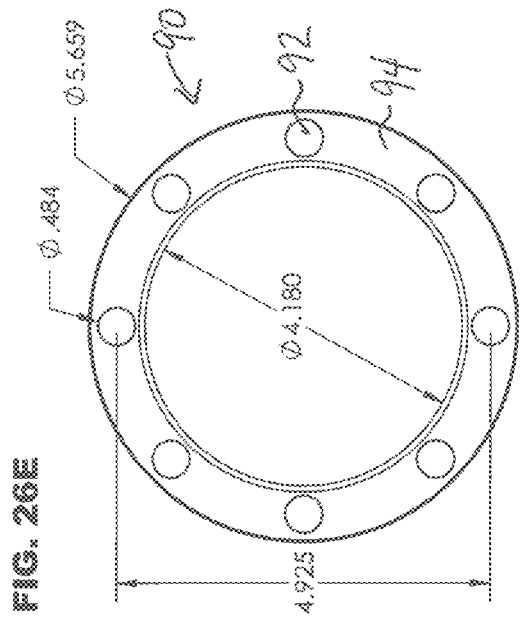
Figure 26F:
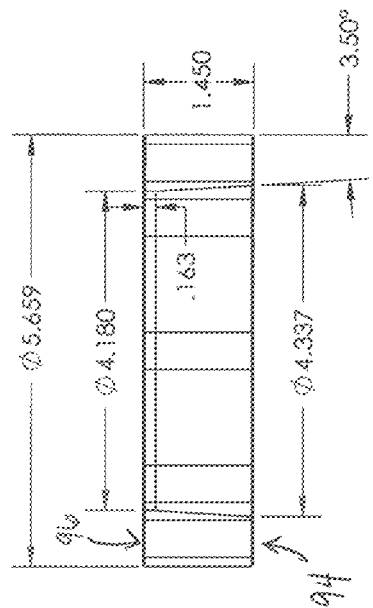
Figure 26D:
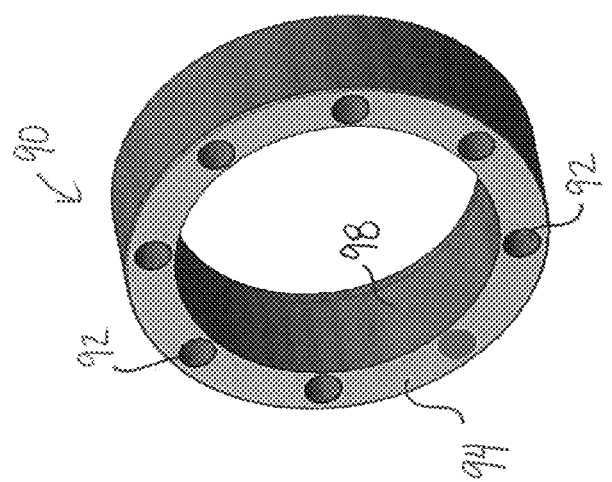
Figure 26G:
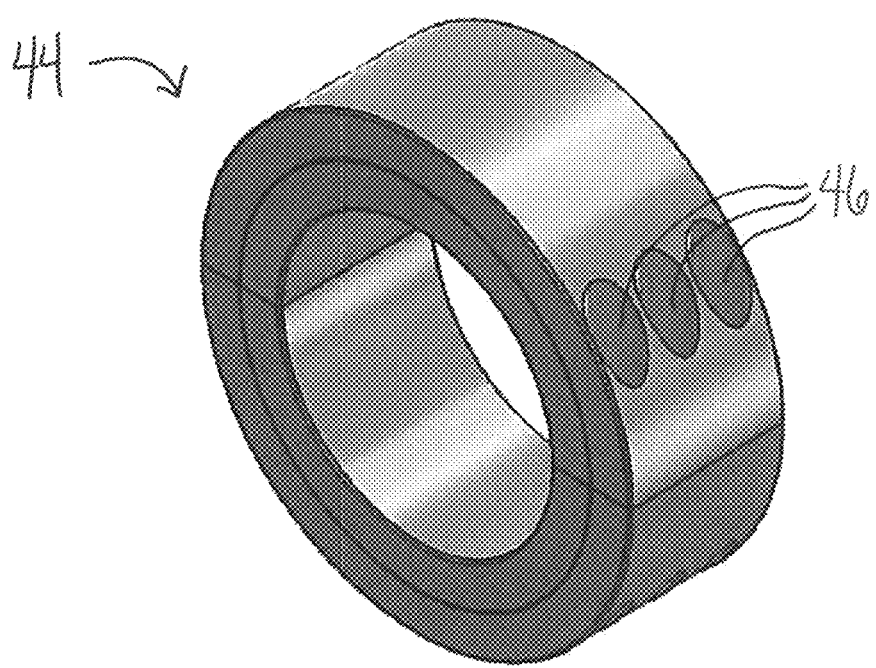
FIG. 26G shows a two-piece split ring.

FIGS. 26A-F show one embodiment of a hub lock. FIG. 26G shows a two-piece split ring 44. FIG. 35 shows a two-piece split ring 44, which may be made of 1026 steel tubing.

Figures 27A, 27B:
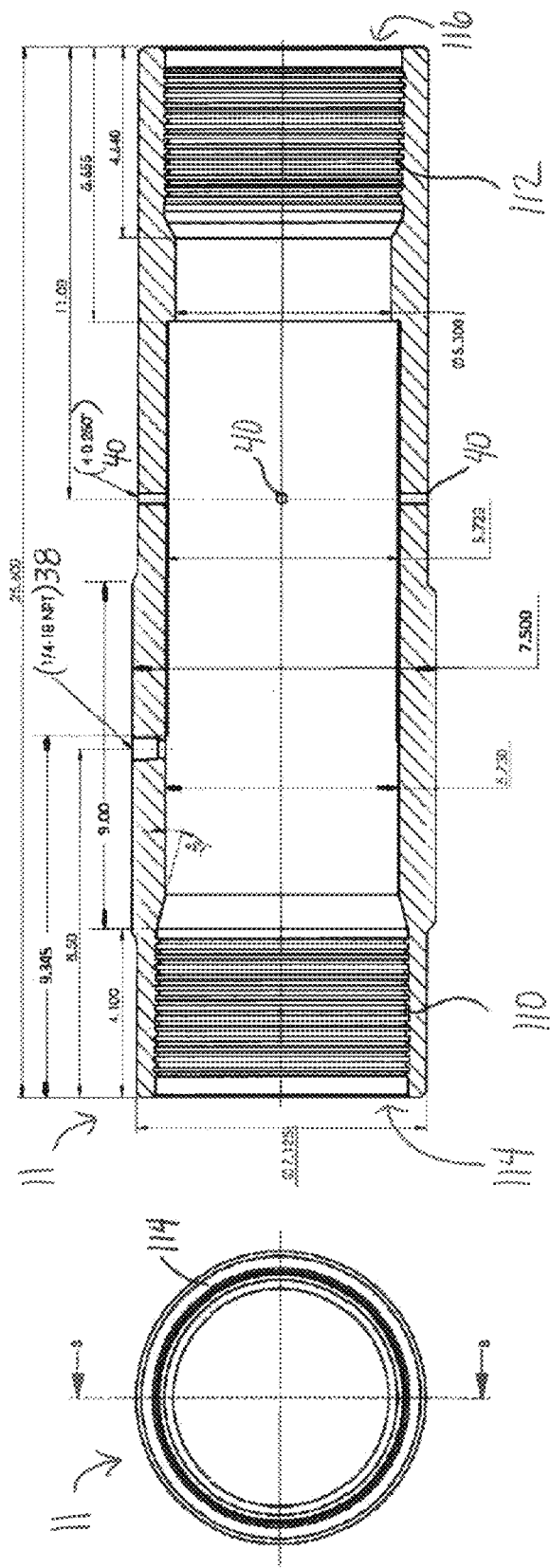
FIGS. 27A-27B show another embodiment of a flow housing.
Figures 36A, 36B:
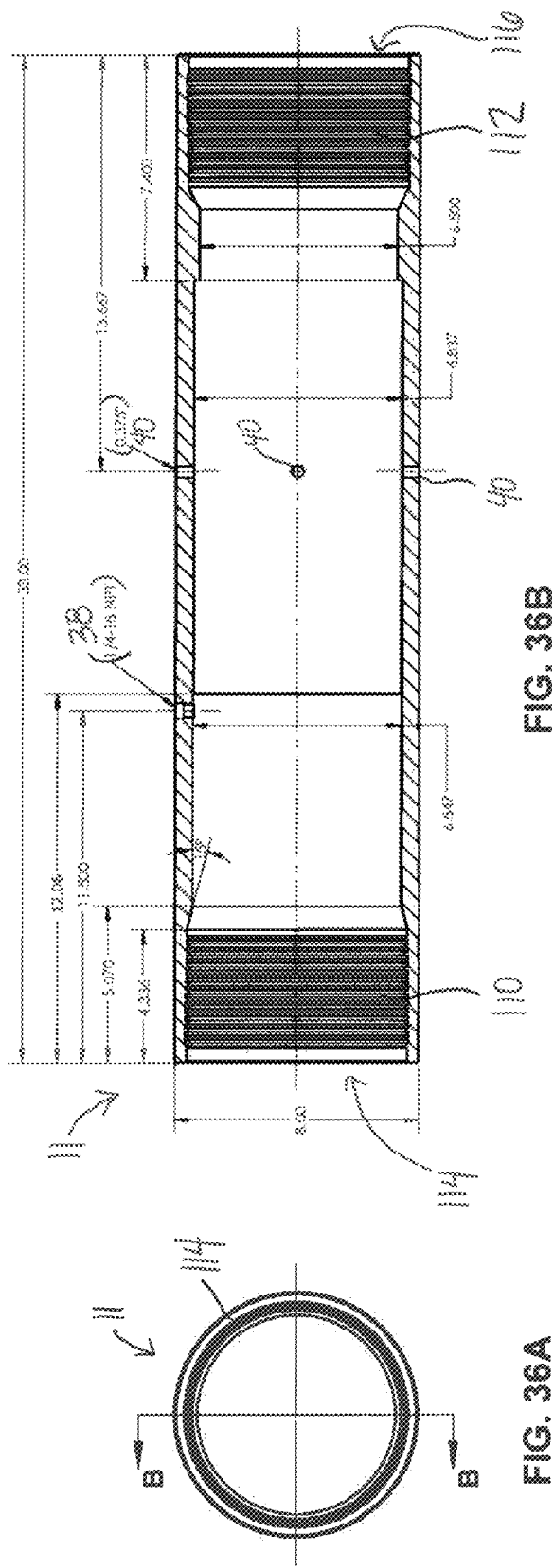
FIGS. 36A-36B show another embodiment of a flow housing.

FIGS. 18A-B show another embodiment of a flow housing 11. The flow housing 11 can include a DU bearing (not shown) for additional support and a NPT plug to plug the opening 38 for lubricating fluid. FIGS. 27A-B show another embodiment of a flow housing 11. FIGS. 36A-B show another embodiment of a flow housing 11.

Figure 19B:
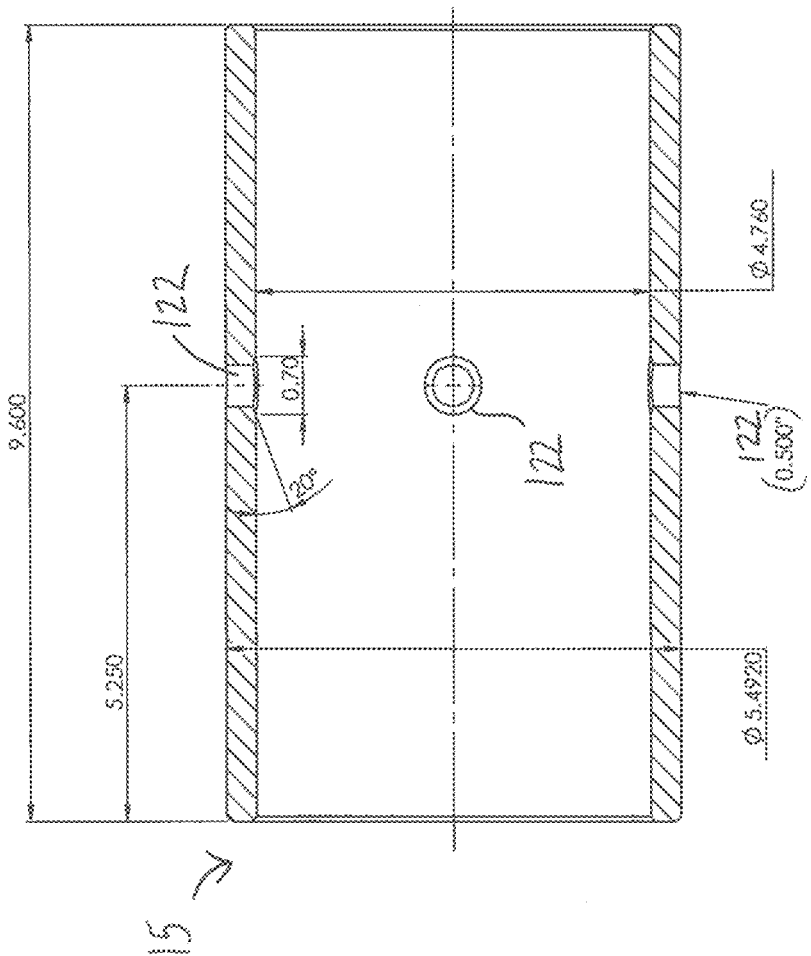
FIGS. 19A-19B show another embodiment of a flow sleeve.
Figure 19A:
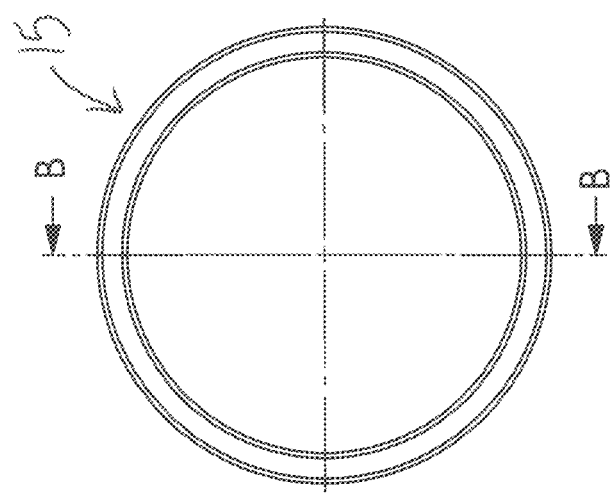
Figure 28B:
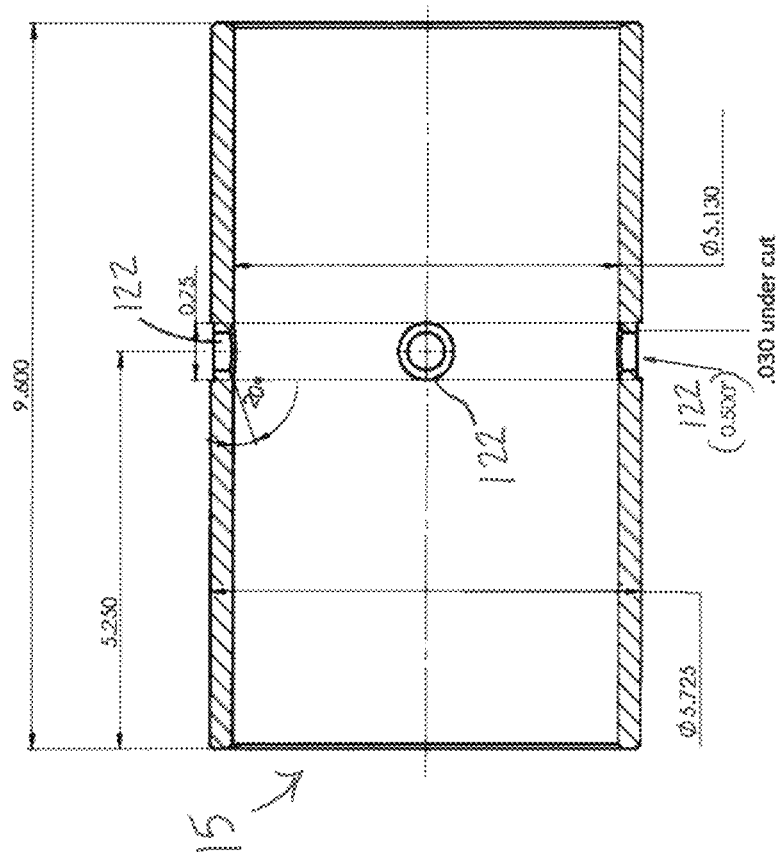
FIGS. 28A-28B show another embodiment of a flow sleeve.
Figure 28A:
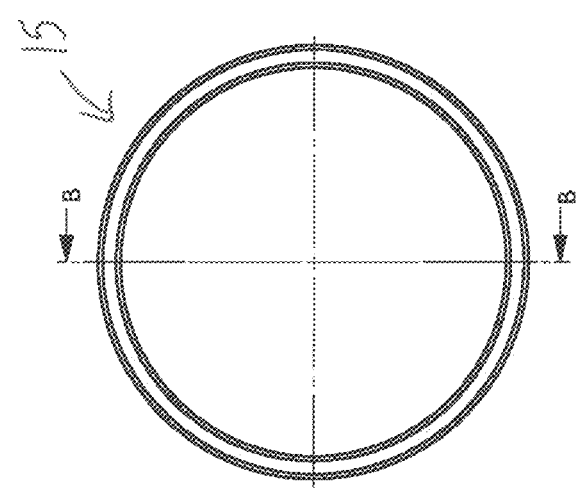

FIGS. 19A-B show another embodiment of a flow sleeve 15. FIGS. 28A-B show another embodiment of a flow sleeve 15. FIGS. 37A-B show another embodiment of a flow sleeve 15, which may have an inner surface finished to 8 microns.

Figure 20A:
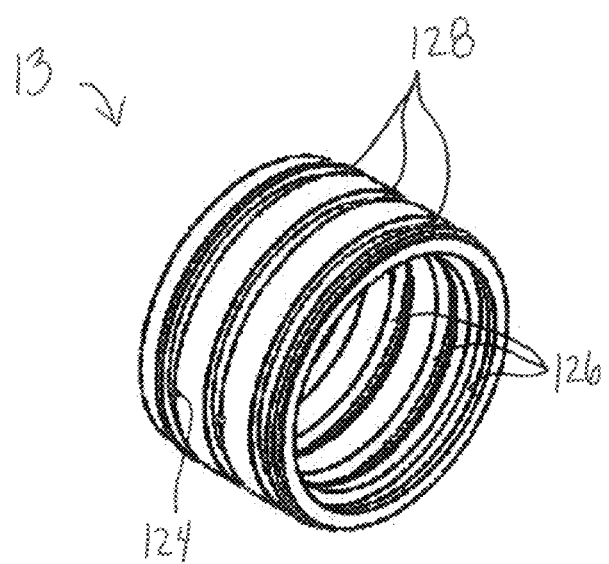
Figure 29A:
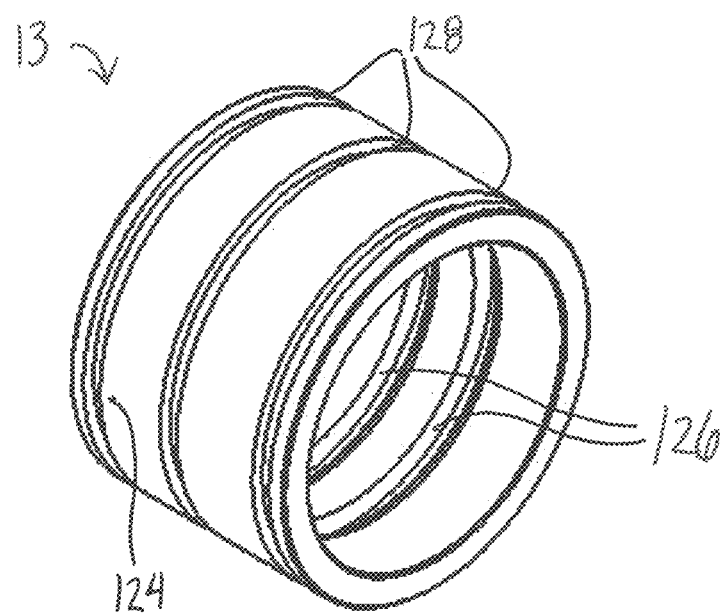
FIGS. 29A-29C show another embodiment of a piston.
Figure 29C:
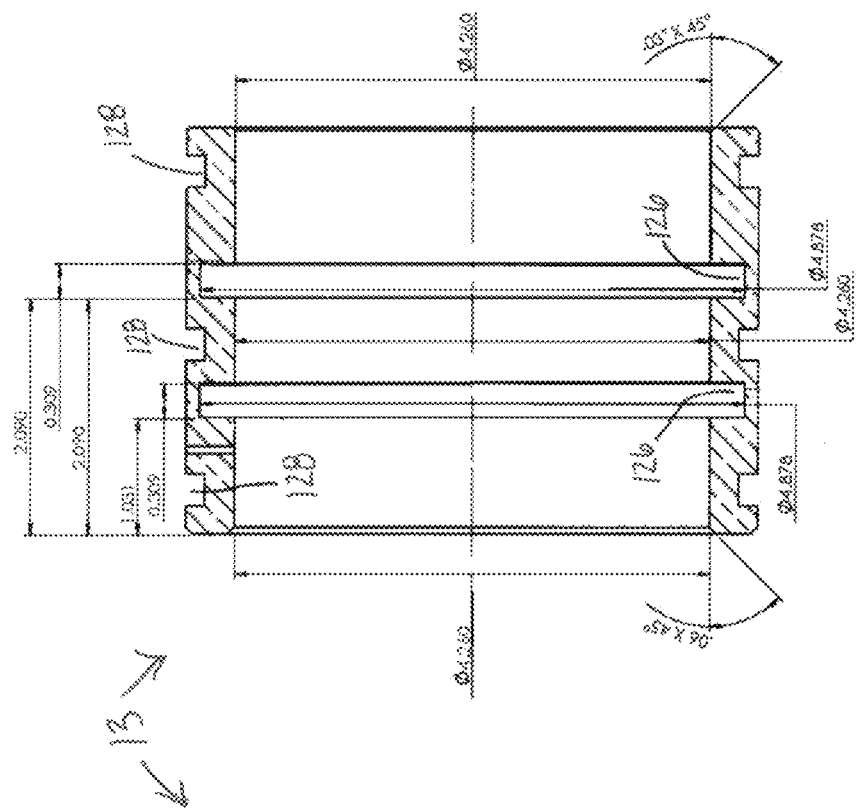
Figure 29B:
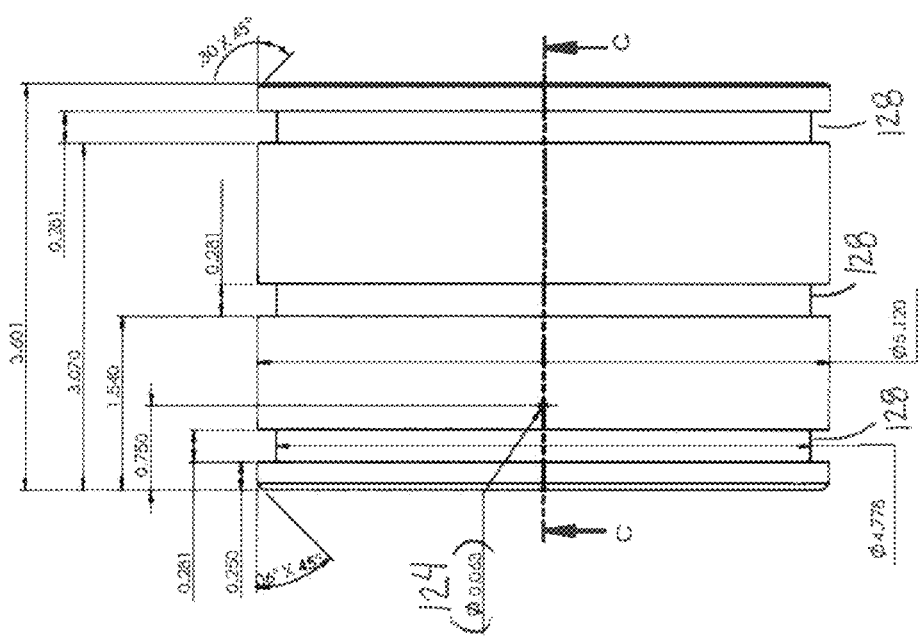

FIGS. 20A-C show another embodiment of a piston 13. In one embodiment, the piston 13 is made of C360 brass. FIGS. 29A-C show another embodiment of a piston 13. In one embodiment, the piston 13 is made of 4140 annealed steel. FIGS. 38A-C show another embodiment of a piston 13. The piston 13 may use three O-rings, two Kalsi seals, and one wiper seal.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A sealed bearing pack for use in a mud motor assembly, the sealed bearing pack comprising:
    a bearing mandrel having an outer surface having a first outer diameter, a second outer diameter, a third outer diameter, a groove positioned within the third outer diameter, and a shoulder between the second outer diameter and the third outer diameter;
    an outer housing comprising:
        a lower bearing housing with a lower end, an upper end, at least one opening, and an inner surface positioned proximate to the second outer diameter of the bearing mandrel outer surface, wherein the inner surface has two or more grooves for receiving sealing elements, and wherein the at least one opening is for providing a lubricating fluid;
        an adapter housing section with a lower end having a lower surface, an upper end having an upper surface, and a substantially smooth inner surface, wherein the lower end of the adapter housing is interconnected to the upper end of the lower bearing housing; and
        a flow housing with an inner surface, an outer surface, a lower end, an upper end, a first opening, and a second opening, wherein the lower end of the flow housing is interconnected to the upper end of the adapter housing, and wherein the first opening is adapted to allow for introduction of the lubricating fluid and the second opening provides communication to an annulus of the sealed bearing pack and wellbore;
    a hub lock comprising a lower surface and an inner surface, wherein the hub lock is positioned in the groove of the bearing mandrel outer surface such that the inner surface of the hub lock is adjacent to the outer surface of the bearing mandrel;
    an on-bottom thrust bearing assembly encircling the third outer diameter of the bearing mandrel outer surface and positioned within the lower bearing housing, wherein a lower surface of the on-bottom thrust bearing assembly is positioned adjacent the shoulder of the bearing mandrel outer surface, wherein an upper surface of the on-bottom thrust bearing assembly is positioned adjacent the lower surface of the adapter housing, and wherein the on-bottom thrust bearing assembly rotationally supports the bearing mandrel;
    an off-bottom thrust bearing assembly encircling the third outer diameter of the bearing mandrel outer surface and positioned within the flow housing, wherein a lower surface of the off-bottom thrust bearing assembly is positioned adjacent the upper surface of the adapter housing, wherein an upper surface of the off-bottom thrust bearing assembly is positioned adjacent the lower surface of the hub lock;
    a bearing encircling the third outer diameter of the bearing mandrel outer surface and having an outer surface positioned adjacent to the substantially smooth inner surface of the adapter housing;
    a piston encircling the third outer diameter of the bearing mandrel outer surface, the piston comprising an outer surface having at least two grooves and an inner surface having at least two grooves, and wherein the piston is adapted for separating the lubricating fluid from drilling mud; and
    a flow sleeve having an outer surface positioned proximate to the inner surface of the flow housing and an inner surface positioned proximate to the outer surface of the piston, wherein the outer surface of the flow sleeve comprises at least two grooves for receiving sealing elements, and wherein the flow sleeve comprises an opening positioned concentrically aligned with the second opening of the flow housing.

2. The sealed bearing pack of claim 1, wherein an outer surface of the lower end of the adapter housing has threads to threadingly engage threads on an inner surface of the upper end of the lower bearing housing.

3. The sealed bearing pack of claim 1, wherein an outer surface of the upper end of the adapter housing has threads to threadingly engage threads on an inner surface of the lower end of the flow housing.

4. The sealed bearing pack of claim 1, wherein the on-bottom thrust bearing assembly comprises one radial bearing and two races.

5. The sealed bearing pack of claim 1, wherein the off-bottom thrust bearing assembly comprises one radial bearing and two races.

6. The sealed bearing pack of claim 1, wherein an upper end of the sealed bearing pack is interconnected to a flex shaft.

7. The sealed bearing pack of claim 1, wherein pressure is equalized between an interior of the sealed bearing pack and the annulus of the sealed bearing pack and the wellbore.

8. The sealed bearing pack of claim 1, wherein the hub lock further comprises a two-piece split collar and an outer collar.

9. The sealed bearing pack of claim 1, wherein the piston comprises at least one opening through which the lubricating fluid can flow.

10. The sealed bearing pack of claim 1, further comprising a second bearing positioned concentrically within the adapter housing.

11. The sealed bearing pack of claim 10, further comprising a third bearing positioned concentrically within the lower bearing housing.

12. The sealed bearing pack of claim 1, wherein the flow sleeve is selectively removable from the sealed bearing pack.

13. The sealed bearing pack of claim 1, wherein one opening in the at least one opening in the lower bearing housing is positioned between two grooves of the two or more grooves for receiving sealing elements.

14. The sealed bearing pack of claim 1, wherein the lower bearing housing further comprises at least one lubricating fluid reservoir positioned between each groove in the two or more grooves in the lower bearing housing.

* * * * *